United States Patent [19]
Pratt, Jr. et al.

[11] 3,871,215
[45] Mar. 18, 1975

[54] OPTO-ELECTRONIC APPARATUS TO GENERATE A PULSE-MODULATED SIGNAL INDICATIVE OF THE MECHANICAL STATE OF A SYSTEM

[75] Inventors: George W. Pratt, Jr., Wayland; Paul G. McMullin, Malden, both of Mass.

[73] Assignee: Massachusetts Institute of Technology, Cambridge, Mass.

[22] Filed: June 19, 1972

[21] Appl. No.: 264,121

Related U.S. Application Data
[62] Division of Ser. No. 141,486, May 10, 1971.

[52] U.S. Cl................................................ 73/136 A
[51] Int. Cl. ............................................. G01l 3/08
[58] Field of Search.................. 73/136 A; 356/152; 324/175; 250/230, 231 SE, 233; 307/232

[56] References Cited
UNITED STATES PATENTS

| | | | |
|---|---|---|---|
| 2,586,540 | 2/1952 | Holden | 73/136 A |
| 2,655,036 | 10/1953 | Chapman | 73/70.1 |
| 3,206,616 | 9/1965 | Webb | 307/232 |
| 3,478,227 | 11/1969 | Ito | 307/232 |
| 3,505,865 | 4/1970 | Kihlberg et al. | 73/136 A |
| 3,538,762 | 11/1970 | Parkinson et al. | 73/136 A |
| 3,545,265 | 12/1970 | McIlraith et al. | 73/136 A |
| 3,589,178 | 6/1971 | Germann | 73/136 A |
| 3,604,255 | 9/1971 | Bart | 73/136 A |
| 3,654,480 | 4/1972 | Stephenson | 324/175 UX |

FOREIGN PATENTS OR APPLICATIONS

| | | | |
|---|---|---|---|
| 1,183,276 | 12/1964 | Germany | 73/136 A |
| 1,224,956 | 9/1966 | Germany | 73/136 A |
| 919,421 | 2/1963 | United Kingdom | 324/175 |
| 1,091,577 | 11/1967 | United Kingdom | 260/231 SE |
| 164,148 | 3/1965 | U.S.S.R. | 73/136 A |

*Primary Examiner*—Charles A. Ruehl
*Attorney, Agent, or Firm*—Arthur A. Smith, Jr.; Robert Shaw; Martin M. Santa

[57] ABSTRACT

Apparatus is disclosed for obtaining torque and angular velocity of a load transmitting shaft of a prime mover to provide control functions that can be fed back to the operational controls of said prime mover thereby to monitor and control the operating characteristics thereof. The apparatus is described primarily in connection with the preferred embodiment thereof in which torque and rpm data from the drive shaft of an automobile are used to derive further data in the way of electric signals which in turn are fed back to control the automobile output and provide, among other things, pollution and/or efficiency control for the automobile. The torque values are obtained using a light modulation scheme whereby the modulated light provides electric signals from which the torque information is derived.

45 Claims, 30 Drawing Figures

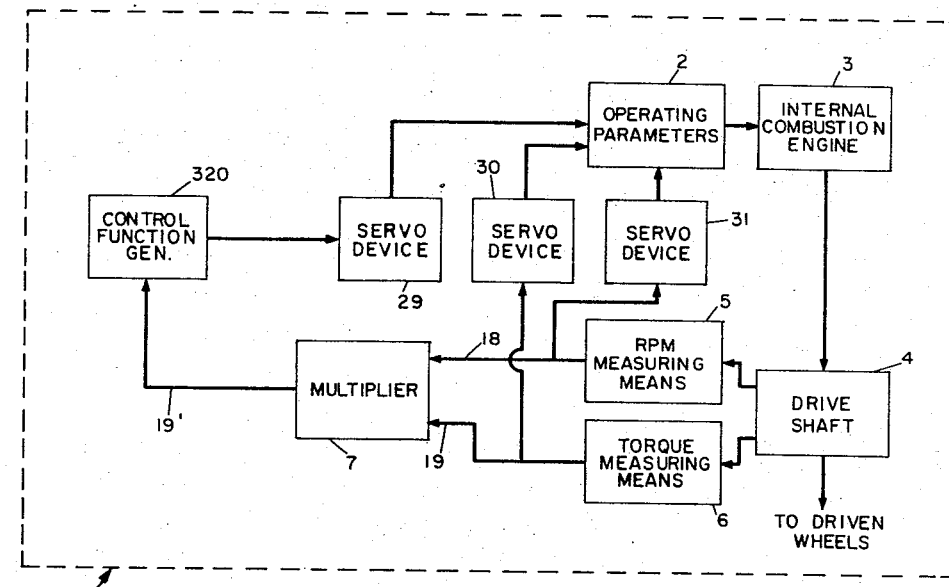
FIG. 1
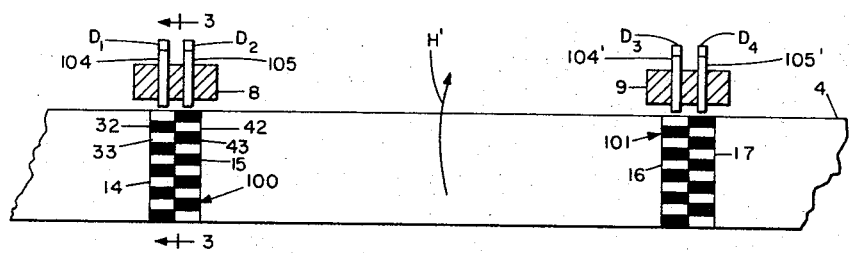
FIG. 2
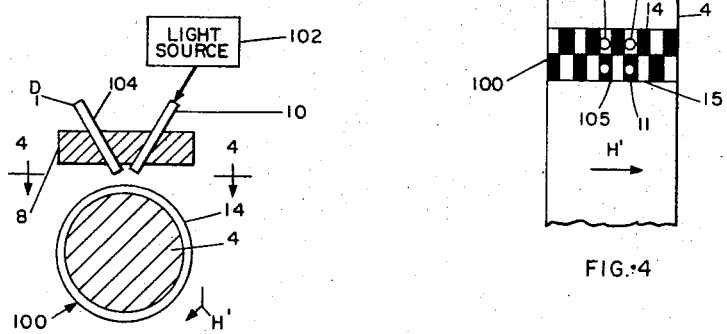
FIG. 3
FIG. 4

| LOGIC ELEMENT \ STATE | 00 | 01 | 10 | 11 |
|---|---|---|---|---|
| AND | — | — | — | ✓ |
| OR | — | ✓ | ✓ | ✓ |
| NAND | ✓ | ✓ | ✓ | — |
| NOR | ✓ | — | — | — |

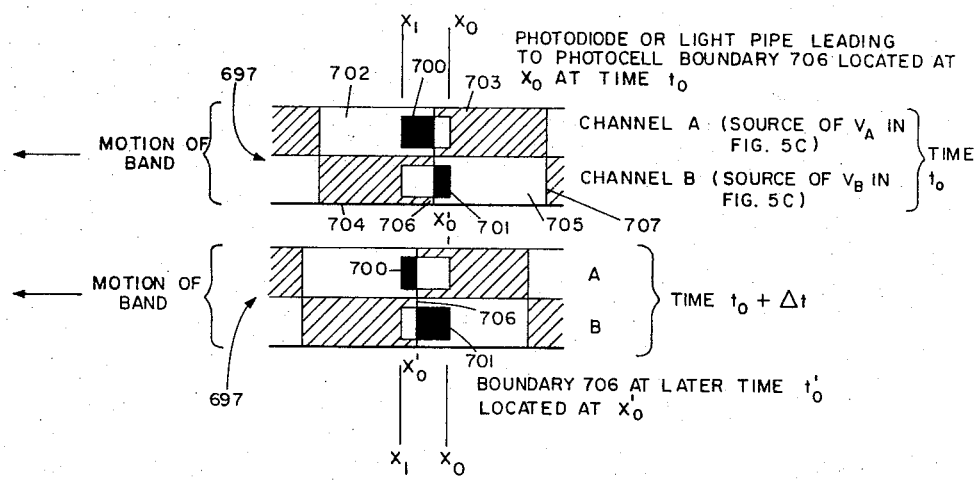
FIG. 5D
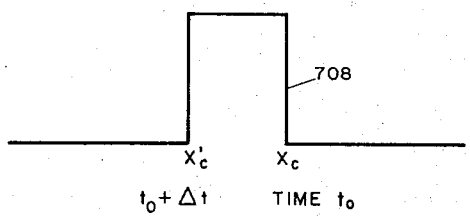
FIG. 5E
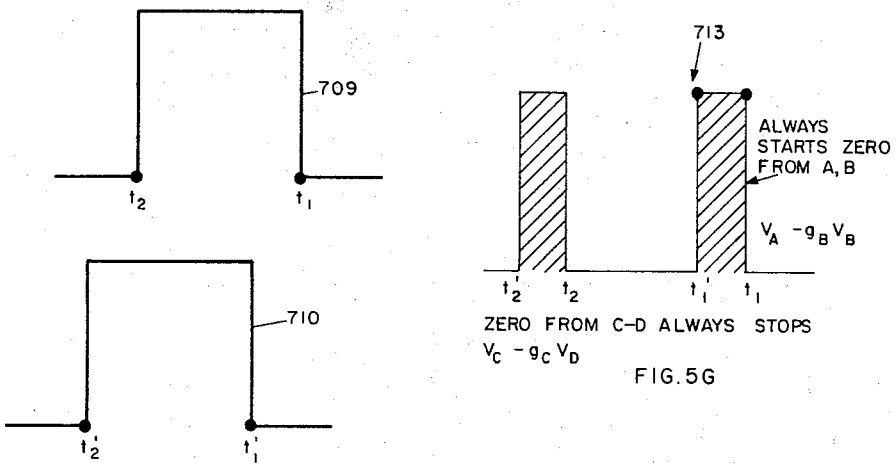
FIG. 5F
FIG. 5G

OPTO-ELECTRONIC APPARATUS TO GENERATE A PULSE-MODULATED SIGNAL INDICATIVE OF THE MECHANICAL STATE OF A SYSTEM

This is a division of parent application Ser. No. 141,486 filed on May 10, 1971, and is being filed to comply with a requirement for restriction in the parent application.

The present invention relates to control apparatus for controlling the operating characteristics of a prime mover and, in particular, to apparatus wherein light modulation is used to provide signals indicative of the output of the prime mover, which signals can be fed back to control the prime mover.

Prior art of interest in connection with the present invention is disclosed in U.S. Pat. Nos. 2,586,540 (Holden); 3,495,452 (Johnson, Jr. et al.); 2,136,223 (Thomas); 2,313,923 (Chubb): 2,947,168 (Yang); 3,130,581 (Schulman); 2,402,719 (Allison); 2,938,378 (Canada et al.); and 3,111,028 (Lebow).

In the recent drive to reduce pollution in the atmosphere various govenmental agencies have decreed that the internal combustion engine in today's autombilies be built so as to minimize amounts of pollutants, such as hydrocarbons, carbon monoxide, oxides of nitrogen and the like emitted to the atmosphere. It would be possible to achieve superior operation of present engines if the engine could be adjusted as a function of the power called for and the power or torque actually being developed. However, at present there exists no reasonably economical means for constantly measuring the torque or power output of the engine so that the operating parameters of the engine may be continually adjusted in relation to the torque or power in such a way that overall performance is optimized. For example, it is known that there are certain input fuel rates, certain fuel-to-air ratios, and certain spark advance settings which serve to maximize fuel burning within engine cylinders and/or maximize power output. It is further known that these various engine conditions vary with automobile speed and with conditions of acceleration, deceleration, constant speed, etc., all of which can be determined for any particular automobile by measuring the torque upon the drive shaft thereof and its rpm, from which can be developed feedback signals to provide control functions. The control functions, as later discussed, can be a complex function derived from one or more of the measured operating characteristics, i.e., power, torque and rpm. Not only is it necessary in this particular use to provide torque and rpm values, but it is also necessary that the economics of the situation be considered and that such information be provided by apparatus which is both accurate and inexpensive.

Accordingly, a principal object of the invention is to provide feedback signals indicative of power output and/or angular velocity and/or torque of a power-transmitting shaft of an automobile driven by an internal combustion engine or the like and to effect changes upon the operating parameters of the engine in response to such signals to control the output power thereof.

A further object is to provide the foregoing in apparatus employing a light modulation scheme whereby torque-related twist upon a shaft as a consequence of power being transmitted by that shaft is converted to electric signals indicative of torque, the angular velocity of the shaft being monitored also to provide electric signals and being combined in some circumstances to provide an indication of the power transmitted by the shaft.

A further object is to provide means whereby either the angular velocity or the power transmitted by the shaft or the shaft torque can be used as a basis to provide input signals to the engine either in direct relationship to various values obtained or as complex functions, the signal being fed to servo devices which, in turn, modify engine parameters thereby to control engine output.

A further object is to provide apparatus which can be used to monitor the output power of an internal combustion engine to reduce the pollution caused by such engine.

It will be appreciated by persons skilled in this art that a torque measuring device has uses that go beyond that of controlling automobile engines. Such torque indicating means can be used, for example, to control the outputs of electrical motors driving machinery to provide constant torque outputs, for example, or to control aircraft engines, large marine vessels and the like, or for many, many other puposes. Broadly, therefore, still another object of the invention is to provide a torque-meter wherein torque-related twist of a power transmitting shaft is coverted to changes or modulations in light transmitted or reflected (i.e., modulations of an optical signal), and such changes or modulations in transmitted or reflected light serve as a measure of the torque transmitted by that shaft.

A very important consideration in any apparatus employing a light modulation scheme of the type herein disclosed to derive torque information is that very small angular changes as a result of twist upon the shaft must be sensed. Thus, for example, in the case of autombile drive shafts, torques are experienced from normal operating conditions in the region of 50 ft.-lbs. to extremes as high as 500 ft.-lbs. A useful torque measuring apparatus should reliably measure to within 10 ft.-lbs. The amount of twist from one region axially displaced along the shaft from another region by, say twelve inches for a 10 ft.-lb. torque is of the order of 0.01°. In the typical 2–2½ inch diameter automobile shaft, this represents a change in the relative position at the surface between points axially separated by approximately 1 foot of approximately the order of $10^{-4}$ inches. Thus, any light device intended to read changes in position in that shaft surface, as a consequence of twist on the shaft, must be capable of sensing very, very small movement. A further object, therefore, of the present invention is to furnish a light modulation device capable of sensing, accurately and consistently, very small changes in shaft twist.

The ultimate use for apparatus of the type herein disclosed requires that such apparatus furnish accurate and reliable output signals, but there are cost constraints, particularly in the automotive industry. A still further and very important object of the invention is to provide torque-indicating apparatus which is capable of accurate to very accurate torque information on a consistent, reliable basis, but apparatus which is susceptible, nevertheless, of being produced by mass-production methods to reduce production costs.

In order to convert very small shaft-surface position changes to meaningful feedback signals it is further necessary to sense, quickly, small changes in the magnitude of reflected (or transmitted) optical signals. In one of the disclosed embodiments, two bands at one region of the shaft serve to furnish binary-type signals at such region, the binary-type signals being combined with like signals generated at another region. The duality of such signals allows very fast rates of change of light pick up in the course of shaft rotation. As is explained in greater detail hereinafter, the point of change in such an arrangement may be used as a switching mechanism to supply pulse-type signals whose pulses have very fast rise and fall times thereby making any feedback system employing such pulse signals very responsive. Thus, a further object of the invention is to provide modulation apparatus, pulse output signals or output signals in the form of a series of pulses, initiation and termination of the individual pulses making up the signal, in one embodiment, being a function of the change in radiation reflected by the rotating shaft and in another embodiment a change in light transmitted through a slotted flange arrangement fixed to the rotating shaft; and still another object is to provide in such apparatus means for combining such binary-type signals with further binary-type signals from some similar arrangement at another region along the shaft axially displaced from the first region to provide a further output signal consisting of plurality of pulses, but in this latter instance, providing combined pulses of constant pulse height but varied pulse width.

The foregoing and still further objects are discussed in the detailed explanation that follows and are particularly delineated in the appended claims.

The objects of the invention are attained, broadly, by apparatus for measuring output torques transmitted by a rotating shaft that comprises, in combination: at least two pairs of optical channel means, each pair to provide a difference signal, means for combining the difference signal from one pair with the difference signal from the other pair to give a train of electric pulses whose pulse width is determined by the combined difference signals, said width being variable as a function of the torque transmitted by the shaft and interpretable to give an indication of said torque. In one form of the invention, each difference signal is fed as an input to a threshold device, e.g. a Schmitt trigger, the output of each threshold device being connected as an input to a logic gate to give the variable width pulses; in another form the difference signals from the two pairs are connected as inputs to a threshold device the output of which is a variable width pulse train; and in still another form, gain is provided in the difference signal circuit. The train of electric pulses may be fed through a time averager to a multiplier where they can be combined with rpm readings to provide output power; the output power and/or torque and/or rpm can be converted to complex polynomials by a function generator. The output of the function generator can, in turn, be connected to servo means for controlling an automobile engine or other prime mover, as later discussed.

The invention will now be discussed with reference to the accompanying drawing, in which:

FIG. 1 represents, in block diagram form, an automobile having an internal combustion engine drive or the like and having means for measuring torque transmitted by a load bearing shaft as well as means for measuring shaft angular velocity;

FIG. 2 shows a portion of the shaft to illustrate shaft-twist sensing optical means that includes two pairs of optical channels A–B and C–D located at spaced regions along the shaft, each channel pair having two side-by-side bands of alternate light absorbant and light reflectant areas;

FIG. 3 is a view taken upon the line 3—3 in FIG. 2 looking in the direction of the arrows;

FIG. 4 is a view taken upon the line 4—4 in FIG. 3 looking in the direction of the arrows;

Figures 5A, 10:
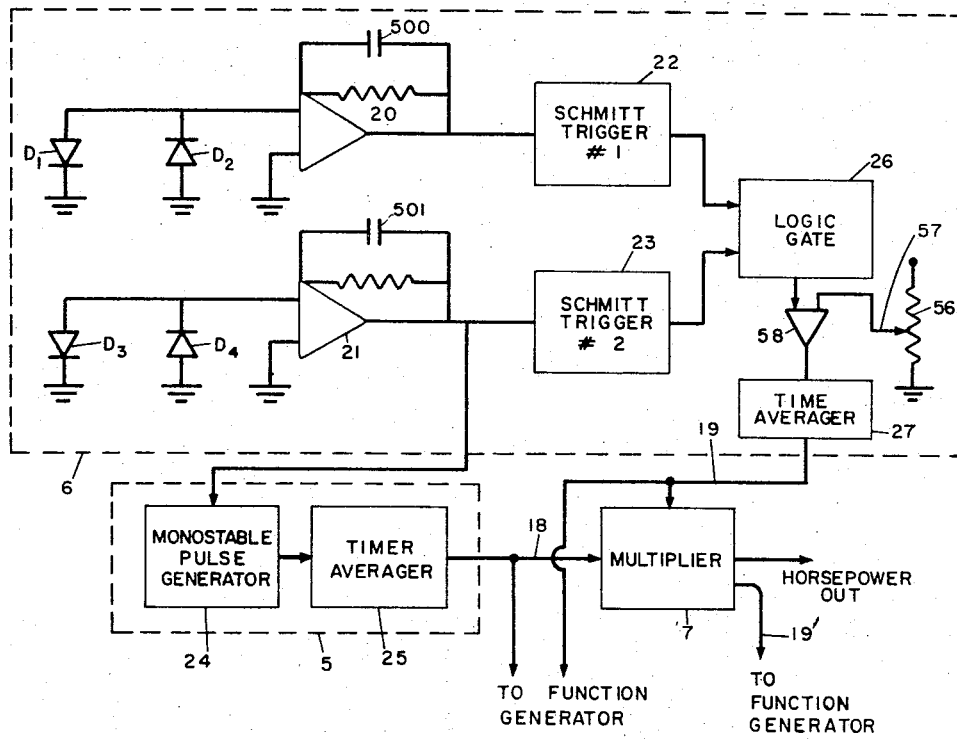
FIG. 5A is a schematic representation, partially in block diagram form, of a scheme for converting light modulation from which torque and angular velocity signals are derived to electric signals.
Figure 5:
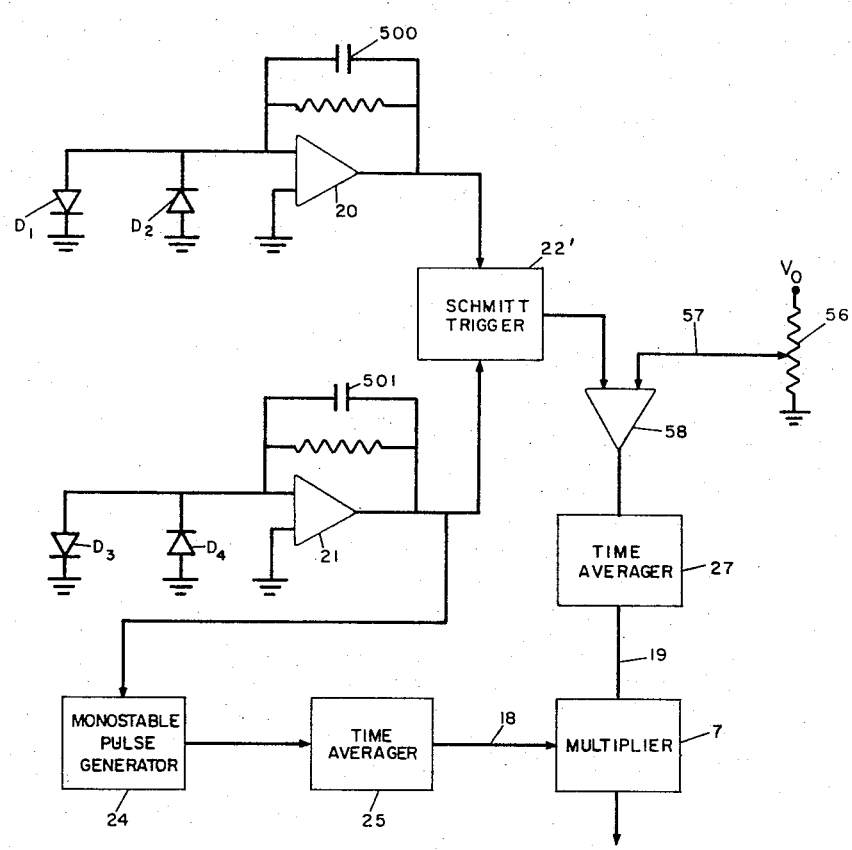
FIG. 5B is a schematic of a modification of the arrangement of FIG. 5A.
FIG. 5C is a schematic of a further modification of the arrangement of FIG. 5A.
FIG. 5D shows a pair of optical channels in two different positions, the channels being operable in connecion with the circuitry of FIG. 5C.
FIG. 5E shows a single electric pulse developed by the circuitry of FIG. 5C from signals obtained from the optical channels in FIG 5D.
FIG. 5F shows a pair of pulses, similar to the single pulse in FIG. 5E but developed in circuitry obtained by slightly modifying the circuity of FIG. 5C.
FIG. 5G shows a pulse train comprising two variable width pulses which can be obtained by feeding the pulses in FIG. 5F to appropriate elements in the circuits of FIG. 5C.
Figure 11:
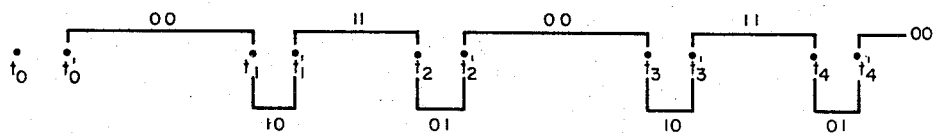
Figure 5C:
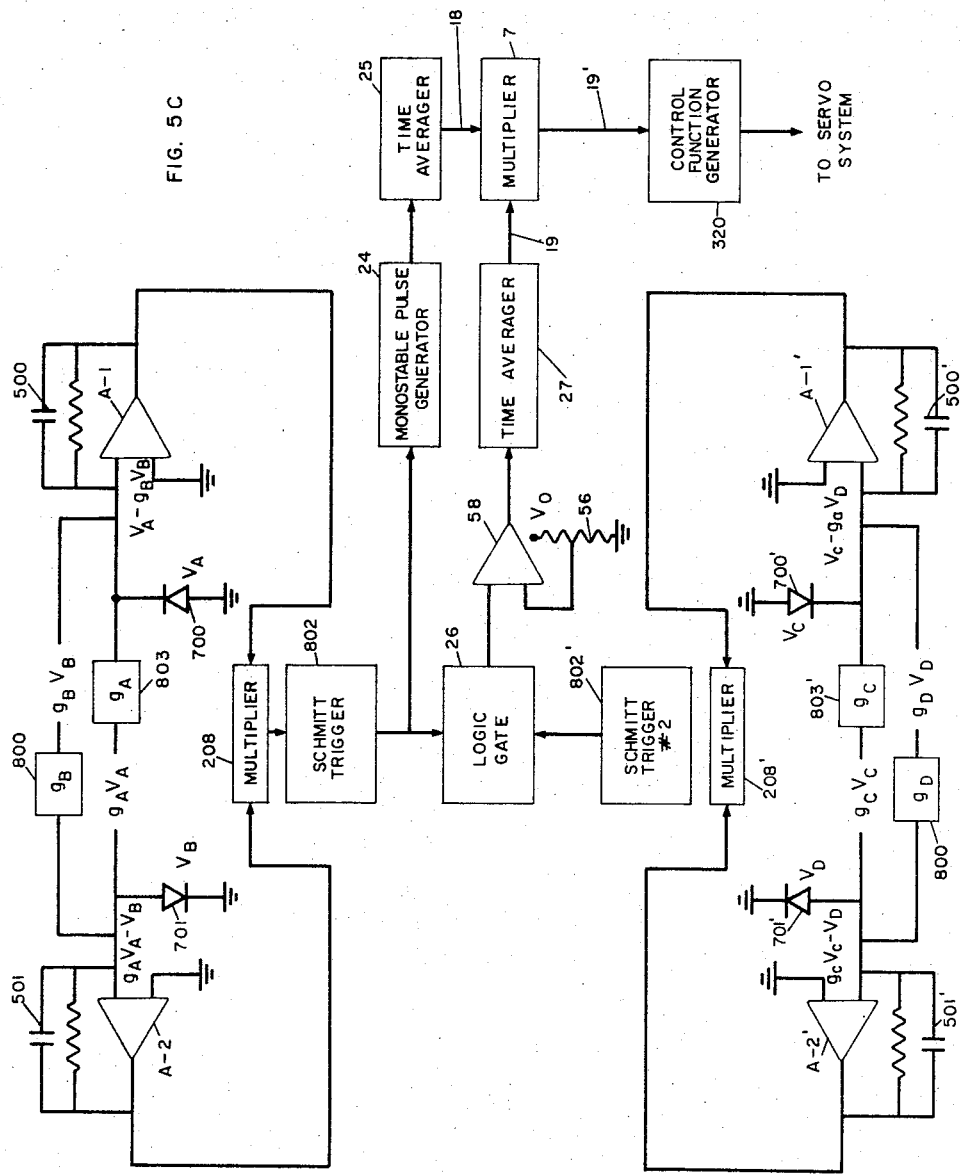
Figure 6A:
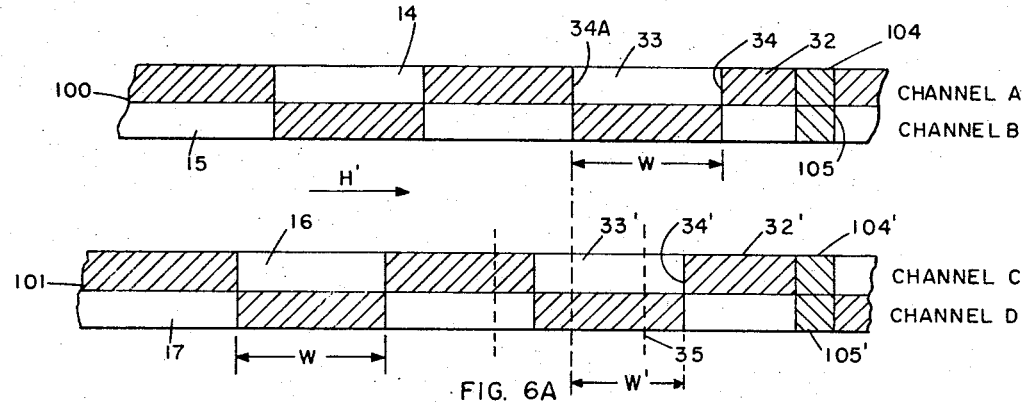
FIG. 6A shows, on an enlarged scale, regions of the shaft having light reflectant and light absorbant areas, in the form of two pairs of bands, from the light modulation stems.
Figure 6B:
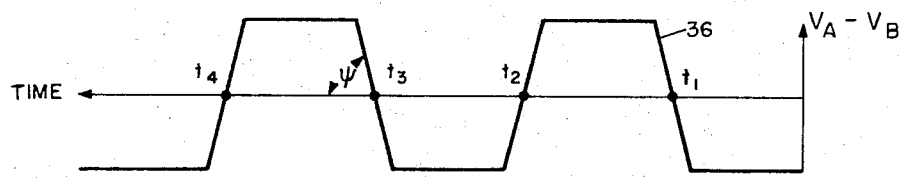
Figure 6C:
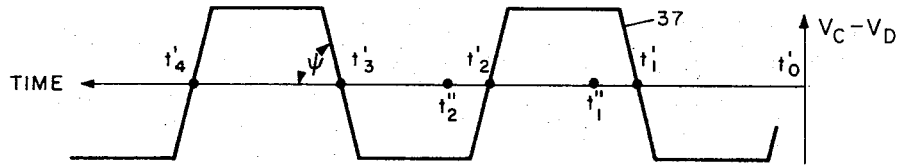
Figure 6D:
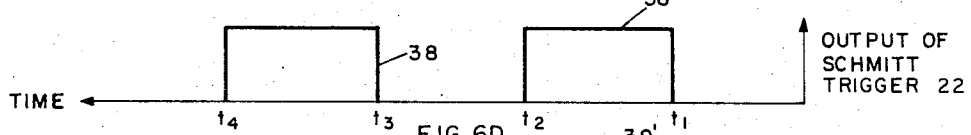
Figure 6E:
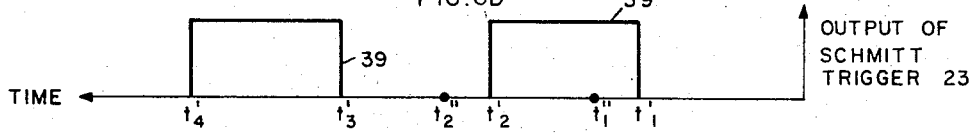
Figure 6F:
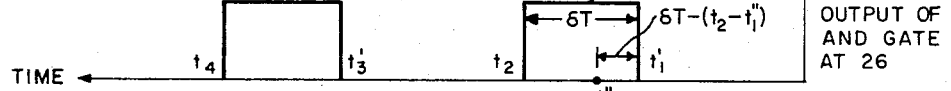
Figure 6G:
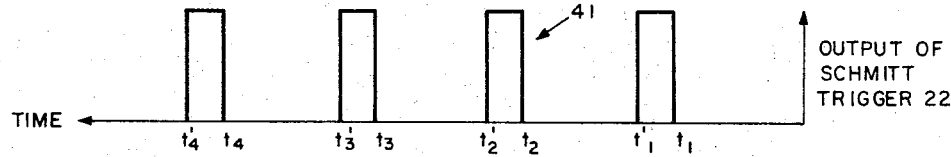
Figure 7:
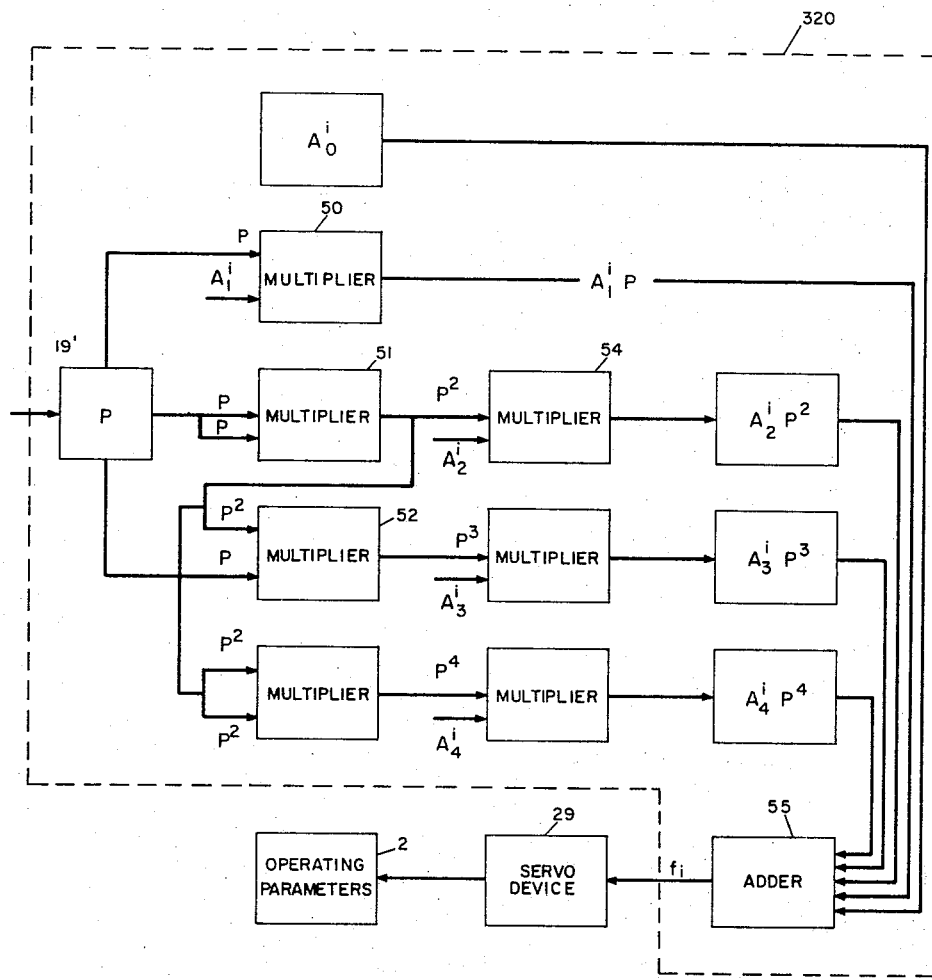
Figure 8:
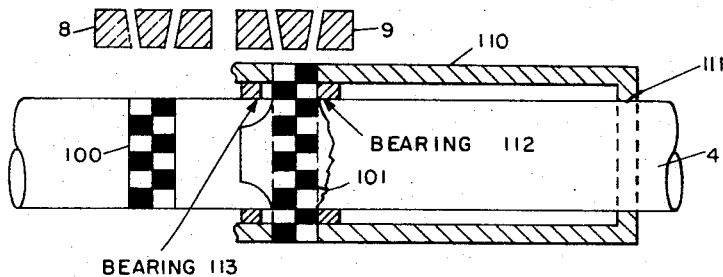
Figure 9A:
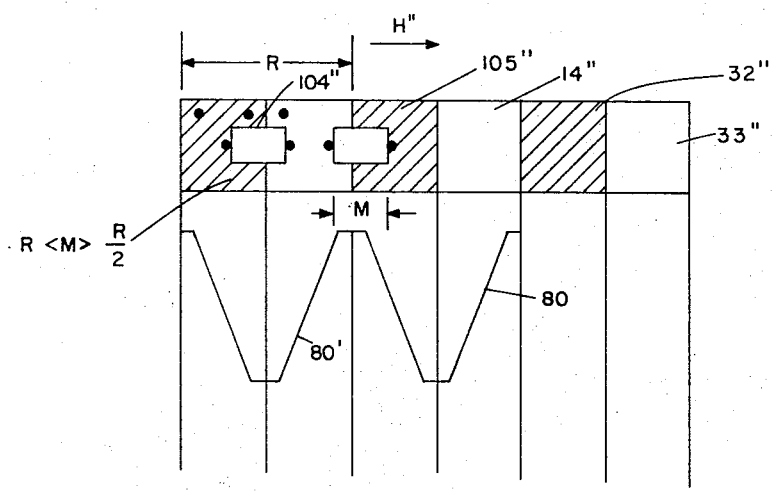
Figure 9B:
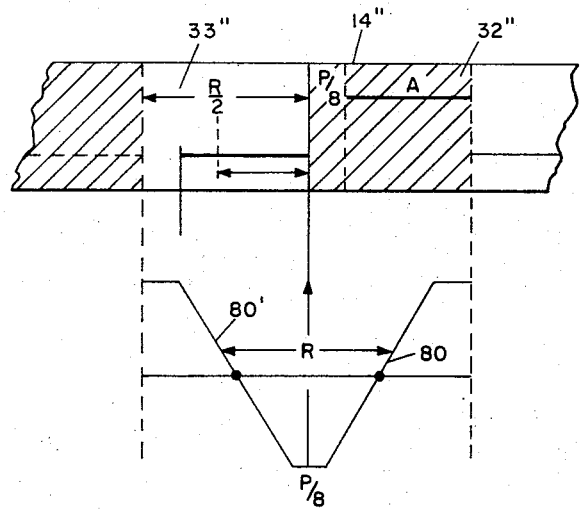
Figure 12:
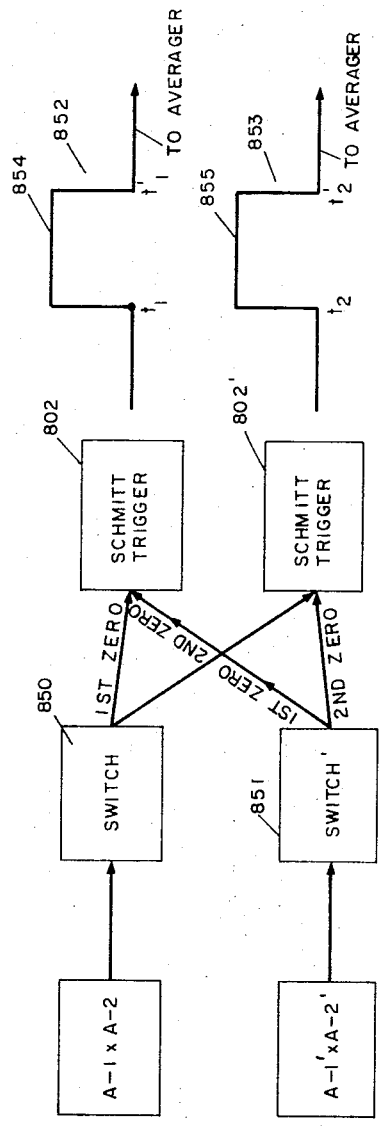
Figure 13:
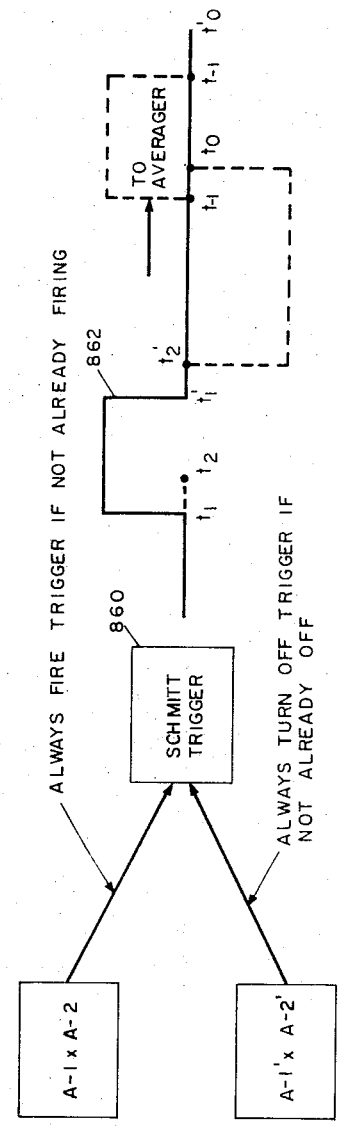
Figure 14:
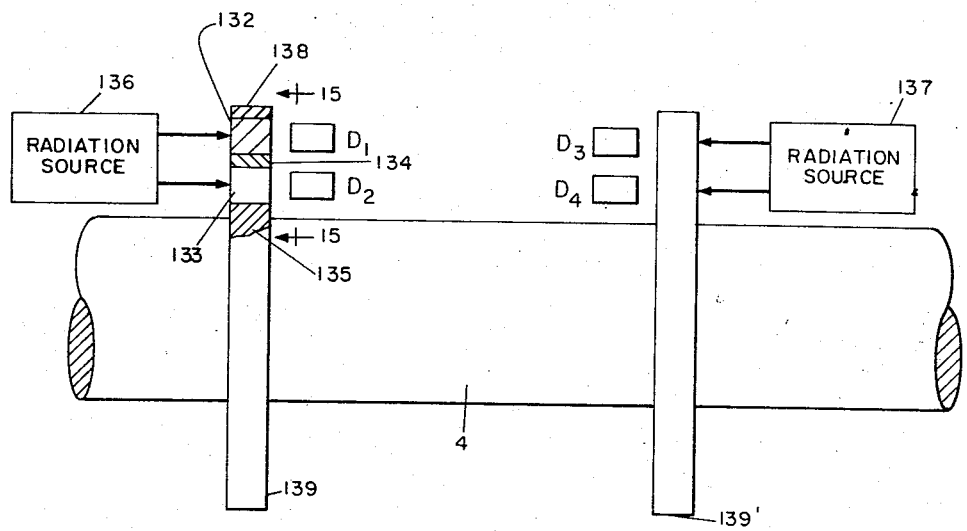
Figure 15:
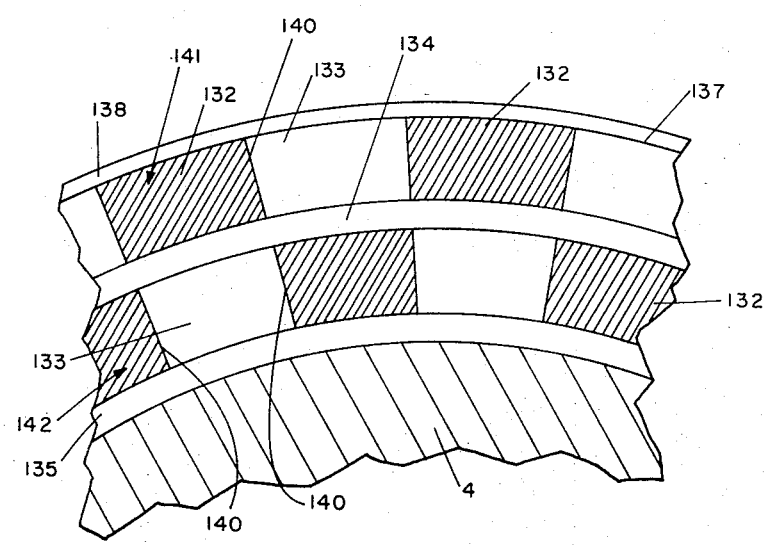

FIG. 6B, C, D, E and F show electric signals in the form of pulses which can be formed by the electric elements in FIG. 5A from the modulated light received from said areas and FIG. 6G shows a variable-width pulse train that can be developed by the circuitry of FIG. 5B;

FIG. 7 shows, in block diagram forms, a function generator adapted to provide function in the form
$f_i = \Sigma_n A_n^i P^n = A_0^i + A_1^i P + A_2^i P^2 + \ldots ;$ FIG. 8 shows a modification of the optical aspects of the apparatus shown in FIG. 2;

FIG. 9A illustrates a pair of optical channels having a single band, rather than two bands as shown in FIG. 2, and having a particular relationship between the length of each optical pick-up of the channels and the width of the alternate light absorbant and light reflectant areas;

FIG. 9B shows a portion of the band of FIG. 9A and a part of a pulse developed by the arrangement of FIG. 9A;

FIG. 10 is a table showing the states assumed by the logic gate shown in FIGS. 5A and 5C when the gate is either an AND-gate, or an OR-gate, or a NAND-gate, or a NOR-gate as a function of the logic state of the system containing the gate, the horizontal lines in the table representing no output from the respective logic element and the check marks representing an output therefrom;

FIG. 11 represents the logic conditions for threshold devices related to the pair of optical channels A-B and C-D and the various time intervals that these threshold devices operate at their respective logic states, the threshold devices thus represented being the Schmitt trigger devices in the circuitry of FIGS. 5A and 5C;

FIG. 12 shows in block diagram form a method of interconnecting the Schmitt trigger devices of FIGS. 5A and 5C to perform the logic functions of a logic gate without using the gate;

FIG. 13 shows in block diagram form a modification of the interconnection scheme shown in FIG. 12;

FIG. 14 illustrates a modification of the apparatus shown in FIG. 2;

FIG. 15 is a partial view, on an enlarged scale, taken upon the line 15—15 in FIG. 14 and looking in the direction of the arrows.

Figure 16:
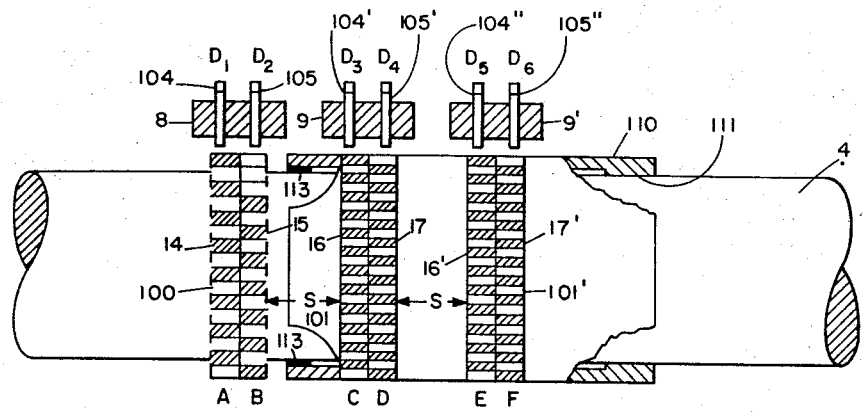

FIG. 16 illustrates a modification of the apparatus shown in FIG. 8; and

Figure 17:
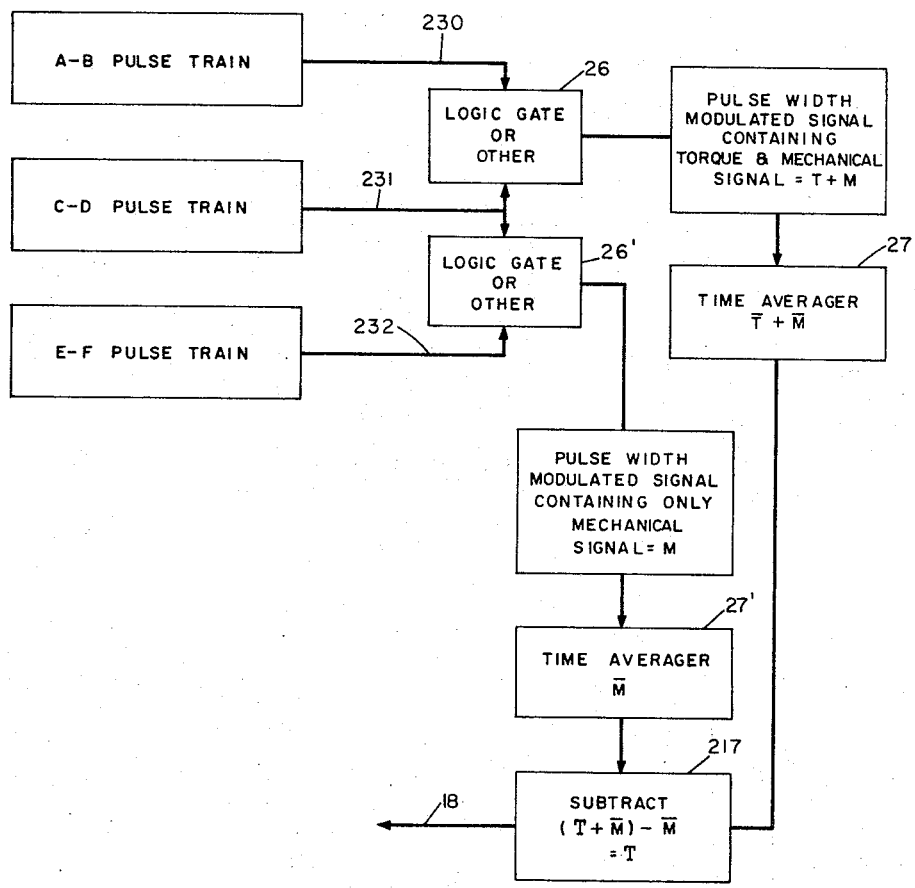

FIG. 17 is a flow chart in block diagram form to describe the utilization of the apparatus in FIG. 16.

Before going into structural details of the apparatus embodying the present inventive concept, there follows now a short discussion of what is intended to be accomplished by it. The discussion is made primarily with reference to a control unit to use in connection with an internal combustion engine for an automobile, which is the preferred embodiment. The automobile is controlled by effecting changes, by use of suitable servo devices, in the amount of fuel delivered to the engine cylinders, the fuel-to-air ratio therein and/or the spark advance, and the control signals supplied to the servo devices comprise at least one of power output, torque output and angular velocity (or complex functions derived therefrom) of a rotating shaft whose twist is a function of the power output of the engine and power called for by the operator or by some regulation device such as a constant rpm control. The shaft in the discussion immediately to follow is an automobile drive shaft. Readings from which the control signals are derived typically are taken by comparing angular twist between spaced regions along the shaft separated axially the order of 6 to 12 inches, and this is done by noting positional changes of the shaft surface at one region relative to the other as a result of such torque-related twist. The shaft twist, which is linear as a function of torque transmitted by the shaft, in such a situation is usually no more than about 0.1 of a degree in a typical 2 inch diameter drive-shaft. Differential linear movements of the shaft surface as small as $10^{-4}$ inches must be detected to provide a useful apparatus.

In the explanation to follow the invention is first discussed in connection with an embodiment that employs two pairs of bands axially displaced along a shaft whose twist is to-be-measured. The bands are adapted to reflect and absorb radiation and thereby furnish binary-type light signals as the shaft rotates. The light signals emanate from the bands in the form of light pulses and these light pulses form the basis for electric signals from which torque (and other) information is derived. Each band pair may be, for example, a photo-etched metallyzed material having an adhesive on the back thereof. However, as is later explained, other specific implementations of the broad basic concept can be employed. Thus, although the immediately following explanation relates to a situation wherein the light pulses are formed by light being alternately reflected and absorbed by the respective bands, the pulses can be formed by a system in which light is alternately transmitted and blocked, for example.

By way of brief overall explanation, the necessary control functions are derived by measuring the torque or twist of the power transmitting shaft shown at 4 in FIGS. 1-4, measuring the angular velocity of that shaft, and combining these measurements to provide a complex control function, for example a polynomial in the tranmistted powers, e.g., $f_i = \Sigma_n A_n^i P^n$, or some other function; or the torque and velocity measurements can themselves provide useful control function which are sent to a servo system to actually carry out the adjustment of the engine. The discussion of this paragraph concerns means for obtaining torque values. Referring now to FIG. 2, the torque-determining means contains a fist pair of contiguous annular bands 100 secured around the shaft 4 (see FIG. 3) at a first region and a second pair of contiguous annular bands 101 secured around the shaft at a second region, as shown. The regions, tyically, are spaced 6 to 12 inches apart, and the amount of differential movement at the shaft surface between the two regions as a result of twist normally encountered is in the range of $10^{-2}$ to $10^{-4}$ inches for an automobile drive shaft. It should be quite apparent, therefore, that for meaningful control signals to be obtained, small twist movement of the shaft 4 must be detected. To accomplish this end, in the present invention radiant energy is directed to said spaced regions and sensed, and the magnitude of any changes in the radiation as the shaft rotates in the direction indicated by the arrow H', due to twist, are detected. The radiant energy is obtained from the light source shown at 102 in FIG. 3, which may be a light bulb, a light emitting diode or the like which delivers light energy directly or through light pipes (e.g. fiber optic elements which may range from 0.01 to 0.001 inches in cross dimensions) 10 and 11 to the individual members 14 and 15 of the pair of bands 100. Each of the member strips 14 and 15 is composed of alternate areas (such as the areas designated 32 and 33 on the member 14) having different light reflecting and absorbing characteristics (i.e., the area 32 mostly absorbs light energy and the area 33 mostly reflects it) immediately adjacent areas of the other member (such as the areas designated 42 and 43 on the member 15) of the pair of bands having another characteristic. For example, as shown, light absorption areas 32 and 43 of the members 14 and 15, respectively, are immediately adjacent light reflection areas 42 and 33, respectively, of the members 15 and 14, respectively. The radiation source 102 associated with the pair of bands 100 directs radiation either directly or through the light pipes 10 and 11 upon each member of the pair of bands 100. Radiation pick-up means is shown comprising a further pair of light pipes 104 and 105; one end of the pipe 104 is positioned to pick up any light reflected from the member 14 and one end of the other pipe 105 is positioned to pick up any light reflected from the other member 15. The light pipes 104 and 105 have light sensitive diodes or other detector devices $D_1$ and $D_2$, respectively, having cross dimensions comparable to the cross dimensions of the associated light pipes, secured to the end of the respective pipe opposite the pick-up end thereof, the devices $D_1$ and $D_2$ each being operable to provide an electric signal which varies as a function of the amplitude level of light transmitted thereto by the asssociated pipe. The light pipes are secured in position by a structural element 8. The second pair of bands 101 has elements similar to those just described in connection with the pair of bands 100. Briefly, these include band members 16 and 17, light pipes 104' and 105', detectors $D_3$ and $D_4$ and a structural element 9. The pick-up means associated with each pair of bands provides a net output signal which acts as a control signal in the form of a pulse train of fixed-height pulses 38' and 39', as shown in FIGS. 6D and 6E. The pulse trains of the two pairs of bands are combined to give the output product pulse train 40 shown in FIG. 6F, the width of each pulse member 40' thereof being related to the twist angle $\theta$ (or torque) of the shaft between the axially separated first and second pairs of bands. In order that switch times of the order of $10^{-1}$ microseconds be obtained to furnish meaningful signals, the rise and fall times of the pulses 38', 39' and 40' must be quite steep. Also, the accuracy of the initiation and termination of the pulses 38' and 39' and, hence, 40' is determined in large measure by the angle designated $\psi$ which is the slope of the net output difference primary signal from each pair of diodes. The angle $\psi$ is greater for the pair of diodes shown than it would be for a single diode and is, further, affected by the individual diode cross dimension and diode constants (i.e., the light-sensitive detectors $D_1$, etc. each has an effective light-sensitive region or zone that is very small in cross dimension in the direction of travel H', for example in FIG. 6A, of the areas 32, 33, 32', 33' therepast and each has light-to-electric-energy time response constants that are fast compared to the time of passage of the areas 32 etc. past each detector so that the rise and fall times (pulse transistion times) of each pulse of said difference primary signal are much less than the duration of the pulse). Furthermore, the pulses 40', as is evident from the discussion herein, are derived from two series difference signals (i.e., the difference primary signals 36 and 37 and the difference signal obtained when the pulse trains 38 and 39 are combined) each of which acts to determine the rise and fall times of the pulses 40', that is, to locate the times $t_1', t_2, t_3', t_4$ hereinafter discussed with great precision The first discussion herein contemplates the use of four optical channels which may be designated A, B, C and D. The light-modulating elements consisting of the bands 14, 15, 16 and 17, and their associated light sensor and light pipes form the channels A, B, C and D, respectively, for present purposes. Each optical channel provides a binary-type message in the form of a chopped radiation beam; thus a message from the channel A can be formed by alternately reflecting and absorbing radiation from the areas of the band 14, as above discussed, to provide a binary message. The binary-type light message, in each instance, is converted to an electric signal by the associated light sensitive detector. The electric signal produced by the optical channel A is mixed with that of the optical channel B, similarly formed, to give a difference, primary signal 36 and that of optical channel C with optical channel D to give another difference primary signal 37. The difference, primary signals 36 and 37 in the embodiment of FIG. 5A are connected to respective Schmitt-trigger devices 22 and 23 which are regulated so that changes in polarity of their inputs (i.e., the difference, primary signals 36 and 37 respectively causes the relevant Schmitt trigger to initiate and terminate a pulse sequentially thereby producing a train of pulses (i.e., 22 produces pulse train 38 and 23 produces pulse train 39)— these two pulse trains are connected to a logic gate 26 to furnish the output pulse train 40 which, when further processed, provides a feedback control signal. In the embodiment of FIG. 5B the electric signals are operated upon, in the manner mentioned in later paragraphs, and then connected to a single Schmitt trigger device. In all situations, the output pulse train eventually generated is in the form of fixed height, but variable width, voltage pulses in the form of a pulse train which is averaged for control purposes. There follows now a detailed explanation of apparatus adapted to perform the foregoing functions.

The diodes $D_1$ and $D_2$, as shown in FIG. 5A, are connected so that their outputs $V_A$ and $V_B$, respectively, are subtracted and the net difference signal is connected to a differential amplifier 20 to provide the net primary output signal 36 shown in FIG. 6B, that indicates a difference in the reflected radiation from the member bands 14 and 15. Two filters 500, 501 are used to filter out undesirable noise. The output of the differential amplifier 20 is connected as an input to the pulse generator 22 which may be Schmitt trigger device, as shown, or a flip-flop or some other threshold device. In this way the net output difference signal acts as a control upon the Schmitt trigger 22 to switch the Schmitt trigger from one state to another as the net output difference signal changes polarity, that is, at the zero crossings $t_1, t_2, t_3$, etc. in FIG. 6B, thereby to provide the train of fixed-height output pulses 38' shown in FIG. 6D. The Schmitt trigger also produces pulses with much shorter rise times than those primary signals generated (as shown in FIGS. 6B and 6C) directly from the output of the operational amplifier 20. Very short rise times permit very accurate device performance. Similarly, the outputs $V_C$ and $V_D$ respectively of diodes $D_3$ and $D_4$ are connected to a differential amplifier 21 which, in turn, acts as a control for the pulse generator 23 (also a Schmitt trigger in the drawing), changes in polarity of the net output difference signal 37 from the diodes $D_3$ and $D_4$ again acting alternately to initiate and terminate pulses 39' of the train of fixed-height pulses 39 in FIG. 6E. The outputs of the pulse generators 22 and 23 are connected as the inputs to a logic gate 26 to give the output product train 40 (also termed "final output pulse train" herein) in FIG. 6F. The product pulse train 40 is a train of fixed height, variable width pulses made up of the variable width pulses 40', as mentioned, the width of each pulse member being related to the twist angle $\theta$ of the shaft between the axially separated first and second pair of bands 100 and 101. The logic gate 26 in the arrangement shown in FIG. 5A performs a multiplier function.

FIG. 5C shows a more elaborate scheme for obtaining a pulse train from a pair of optical channels. In order to measure 50 ft. lbs. of torque on a drive shaft of O.D. 2.4 inches and I.D. of 2.0 inches and having an elastic modulus of $1.7 \times 10^9$ pounds/ft.$^2$, it is necessary to sense a torque-related twist angle of approximately $3.0 \times 10^{-4}$ radians between two points axially separated on the shaft by 12 inches. This would mean a pulse-width modulation of approximately $3.6 \times 10^{-4}$ inches. If changes in pulse width are to be measured to one part in one thousand, then a pulse must be initiated and terminated by a surface rotary motion of the shaft of approximately $10^{-1}$ inches. Hence, the widths of the absorbing or reflecting areas 32, 33, 32', 33' of the bands 100 and 101 would have to be of the order of $10^{-1}$ inches wide. The fabrication of such bands could lead to an inadmissable manufacturing cost. A superior means for generating both sharp and narrow pulses is described by the system shown in FIG. 5C. To understand this system the details of the pulse generation technique are shown in FIG. 5D. A pair of bands 697 containing a pair of optical channels, again channels A and B, consists of alternately reflecting and absorbing regions 702, 703, 705 and 704, as explained earlier. Photo-sensitive devices 700 and 701 sense the amount of light transmitted to them either by reflection (as shown here) or in an alternate embodiment using a transmitted signal. The photo-response of the device 700 is designated $V_A$ and that of the device 701 is designated $V_B$. The photo-response is proportional to the degree of illumination. The output of photocell 700 can be taken to be $V_0[1-(X-X_o)/(X_1-X_o)] = V_A$ and the photocell 701 $V_0[(X-X_o)/(X_1-X_o)]=V_B$ where $X$ denotes the variable position of the edge labeled 706, and where $X_1-X_o$ is the width (i.e., the cross dimension of the light-sensitive region of the solid-state light-sensitive detector perpendicular to each passing boundary 706 at the instant of passage and parallel to the direction of said passage, as shown) of the photocells 700 and 701. Both $v_A$ and $V_B$ are taken as o here. The response $V_B$ is fed into an amplifier or attenuator with gain $g_B$ as shown at 800 in FIG. 5C and the difference, primary signal $S_1=V_A-g_BV_B$ can be fed into the operational amplifier labeled A-1. Then the distance $X_c$, that the boundary or edge designated 706 between an absorbing region 703 and a reflecting region 702 (or between areas 704 and 705) must move to the left in order that $V_A - g_BV_B= 0$, is $X_c = X_1g_BX_o/(g_B+1)$. The larger $g_B$ the smaller $X_c$. The circuit can be such that a zero of $V_A-gV_B$ at $X_c$ can initiate a pulse in the Schmitt trigger shown at 802 of FIG. 5C. As the boundary 706 moves past $X_c$, $V_A-g_BV_B$ will remain negative until the next boundary labeled 707 moves by the photocells. Next, consider the primary signal $S_2=g_AV_A-V_B$ obtained by feeding $V_A$ into an amplifier or attenuator 803. This signal is fed into the operational amplifier A-2, and $g_AV_A - V_B$ has a zero at $X_c'$ given by $X_c' = (X_o+g_AX_1)/(1+g_A)$. The larger $g_A$, the nearer the boundary denoted 706 approaches the left edge $X_1$ of the photocells when another zero is fed to the Schmitt trigger 802 which must be able to sense a change in polarity of any signal fed into it. This is accomplished by multiplying the outputs of A-1 and A-2 (by a multiplier 208) before they are put into 802. At point $X_c'$ the pulse shown at 708 in FIG. 5E begun at $X_c$ is terminated. The pulse width in the space domain is $X_c'-X_c =[(X_o+g_AX_1/g_A+1) - (X_1+g_BX_o/g_B+1)]$ Hence the pulse width is adjustable by varying the gains $g_A$ and $g_B$. Furthermore, as the boundary 706 sweeps past the photocells 700 and 701 (or light pipes 700 and 701 to which the photocells are secured) a complete pulse is generated. Its width depends only on the gains $g_A$ and $g_B$ and the width $X_1-X_o$ of the elements 700 and 701 and does not depend on the widths of the regions 702, 703, 704, 705.

A further advantage of this scheme is the great insensitivity of the pulse width $X_c'-X_c$ to fluctuations $\delta V_A$ and $\delta V_B$ in the photocell output. For example the position $X$ at which the pulse is initiated is changed to a new position $\bar{X}_c$ which differs from $X_c$ by $\bar{X}_c-X_c = - (X_1-X_o)[g_B\delta V_B-\delta VA]/V_o(1+g_B)$ Therefore, this difference may be made a very small fraction of the net voltage fluctuation $\delta V_A-\delta V_B$. In a similar way the point $X_c'$ may be stabilized resulting in a very accurate pulse width $X_c' - X_c$.

The remarks in the previous paragraph describe the generation of a pulse train from a pair of optical channels A and B. A similar means is used to generate a second pulse train from a second pair of channels C and D associated with a point on the power transmitting shaft axially separated from A and B, as before discussed. The associated circuitry 801', 802', etc. performs the same functions as 801, 802 etc. respectively, to generate primary signals $S_1' = V_C-g_D V_D$ and $S_2' = g_CV_C-V_D$. Thus, a pulse similar to the pulse 708 can be formed and both can be fed to the logic gate 26 to provide variable-width pulses like the pulses 40'. In the discussion to follow the condition that the threshold device associated with channels A and B has initiated a pulse is represented by a 1 and the condition that the pulse is terminated is represented by a 0. Similarly the presence of a pulse from channels C and D is represented by a 1 and its absence by a 0. Then the four possible combined states are 00, 01, 10, and 11, the first digit of the pair specifying the state of channels A–B and the second the state of channels C–D. The four logic elements appropriate to the joint states of the combined pairs of channels are described by the table in FIG. 10. As in FIG. 6A pulses from the A–B pair are initiated at $t_1, t_3, t_5$, etc. and terminated at $t_2, t_4, t_6$, etc. and pulses from the C–D channel pair are initiated at $t_1', t_3', t_5'$, etc. and terminated at $t_2', t_4', t_6'$, etc. In FIG. 11 the state of the combined A–B, C–D system is designated as time evolves from prior to $t_1$ to after $t_4'$. Thus an AND gate gives an output between $t_1'$ and $t_2$, between $t_3'$ and $t_4$, etc. As discussed in detail below such an AND-gate will produce a pulse train whose pulses are modulated in width according to the twist of the shaft. An OR-gate produces pulses in duration $t_1-t_2'$, $t_3-t_4'$, etc. A NAND-gate produces pulses in duration $t_0-t_1', t_2-t_3'$, etc. A NOR-gate produces pulses in duration $t_0'-t_1, t_2'-t_3$, etc. All of these pulses depend linearly on the twist of the shaft. Hence the logic gate shown as 26 in FIG. 5A and FIG. 5C can be an AND, OR, NAND, or NOR gate. The function of the logic gate 26 can be performed in still another way to provide a pulse train in FIG. 5G whose time average is linearly dependent on the twist of the shaft. In this situation of amplifiers A-1 and A-2 are multiplied together; the product changing polarity whenever one of the factors changes polarity. Similarly A-1' and A-2' are multiplied together. These product functions are then used as shown in FIG. 12 and FIG. 13. In FIG. 12 switches 850 and 851 direct successive primary signal polarity changes to alternate Schmitt triggers 802 and 802', which produce pulse trians 852 and 853 whose pulses 854 and 855 are width modulated by the twist of the shaft. One or both of these pulse trains 852 and 853 can be time averaged to produce a signal proportional to the torque. In FIG. 13 a change in polarity of the product A-1 × A-2 always initiates a pulse from a single threshold device 860 if no pulse is already present and a change in polarity of the product A-1' × A-2' always terminates a pulse if one is present. The resultant pulse train 862 is made up of pulses 861 whose width is torque modulated and the time average of this pulse train is proportional to the torque. It is apparent from the explanation herein that a wide variety of configurations using switch and interconnection combinations is possible that will result in the signal whose time average depends linearly on the torque.

In the circuitry of FIG. 5B, elements which perform similar functions to elements in other circuits are given the same number designation as in the other circuits. By using the circuitry in FIG. 5B the variable-width pulse train shown at 41 in FIG. 6G can be generated. The outputs of the amplifiers 20 and 21 in FIG. 5B are connected as inputs to a single Schmitt trigger 22'. The output of the Schmitt trigger 22' is in the form of the variable-width pulses making up the pulse train 41.

The discussion in the previous few paragraphs relates to a torque-meter the output of which can, in and of itself, be used to furnish useful data and control functions for internal combustion engines or other types of prime movers. There follows in later paragraphs a further explanation of the torque-meter, including comment upon the importance of fast switching of the various pulsed outputs. There is, however, in this paragraph a short description of the overall apparatus concerned with the automobile control, with particular reference to FIG. 1, where the torque-meter is designated 6. The output of the torque-meter 6 is combined in a multiplier 7 with the output of an angular velocity determining means 5 to supply a power output signal which is connected through a servo device 29 to operating parameters 2 which can be, as above mentioned, means for controlling any or all of fuel input, fuel-to-air ratio and spark advance. The inputs to the multiplier 7 are designated 18 and 19 and the output is designated 19'. The output 19' can be connected to the servo device 29 directly; or, as shown in FIG. 1, it can be connected through the control function generator shown at 320 in FIG. 1 and in detail in FIG. 7, as later discussed, and thence to the servo device 29. In FIG. 5A, the rpm indicator 5 is shown to include a monostable pulse generator 24, connected to receive an output from the differential amplifier 21, and a time averager 25, the latter being connected to the multiplier 7. The logic gate 26 is also connected through a time averager, the time averager 27, to the multiplier 7. The circuitry of FIG. 5A shows the amplifier 21 in the torque-meter circuitry, but it will be understood that the amplifier 21 serves a dual function and is part of the rpm indicator 5, as well. The outputs of the torque-measuring means 6 and rpm indicator 5 can be fed through the multiplier, as mentioned, or they can be fed to servo devices 30 and 31, respectively, as shown, as control functions. Furthermore, the outputs of both can be connected to the respective servo mechanisms through the function generator 320, as indicated in FIG. 5A, the output of the function generator in each case being a complex polynomial of the input function thereto. In any event, a processed signal from the function generator operates to control some prime mover such as, for example, the internal combustion engine designated 3 of an automobile 1 in FIG. 1.

Referring now to FIG. 6A, there is shown an enlarged-scale view of a portion of the shaft 4, primarily to simplify the explanation as to FIGS. 6B 6F. The members 14, 15, 16, 17 in FIG. 6A are made up of areas 32 that absorb light and adjacent areas 33 that reflect light, as before mentioned, the reflected radiation being picked up and transmitted to the light sensitive detectors (e.g. diodes) before discussed by pick-up tubes 104 and 105 in the case of the strips 14 and 15 and by further pick-up tubes 104' and 105' in the case of the strips 16 and 17. FIG. 6A shows the first band 100 comprising the strips 14 and 15 and associated light pipes 104 and 105 as well as the second band 101 comprising the strips 16 and 17 and their associated light pipes 104' and 105', which make up optical channels A, B. C and D, respectively. The sensors associated with the light pipes are not shown in FIG. 6A, but are implied. The direction of the motion of the bands relative to the stationary optical elements 104, 105, 104' and 105' is given by the arrow H'. The pulse trains shown in FIG. 6B–6F are formed when the circuit described in 5A is employed. As the boundary or edge shown as 34 between the reflecting areas 33 and the absorbing areas 32 of the band 14 passes by the optical elements, and signal 36 (i.e., $V_A-V_B$) shown in FIG. 6B is generated by the channels A and B. This signal goes through zero at $t_1$ initiating a pulse 38' in FIG. 6D and terminating the pulse 38' at $t_2$. The time duration of the pulse width 38'(i.e., $t_2-t_1$) is determined by the width W of the reflecting or absorbing areas of the particular band and the shaft rpm. The second band 101, containing the strips 16 and 17, is positioned so that the boundary labeled 34' (corresponding to 34 in the unstressed shaft) would, if the shaft were unstressed fall at the position numbered 35; however, a torque on the shaft moves this boundary to the position of 34' shown in FIG. 6A. A signal 37, generated by the second band 101, is shown in FIG. 6C. If there had been no twist of the shaft, the zeros of primary signal 37 would have occurred at times $t_1''$ and $t_2''$. However, the shift of the boundary from 35 to 34' displaces these zeros to $t_1'$ and $t_2'$. The corresponding pulse 39 in FIG. 6E is also shifted. The signal out of an AND logic gate at 26 appears in FIG. 6F, the pulse train 40 being the resultant of inserted pulse trains 38 and 39 into the AND logic gate, as before mentioned. The width of the pulse 40' in the time domain is $t_2-t_1'$ and is clearly altered by the twist of the shaft from the value $t_2-t_1''$ it would have had in the zero torque case.

The relative displacement of two points on the surface of an automobile drive shaft changes by approximately $10^{-4}$ inches for a torque in the 10 ft.-lb. range to $10^{-2}$ inches in the 500 ft.-lb. range. Corresponding changes in the pulse width of the output of the logic gate will occur which may be described in the time or space domain. If changes of not less than one part in a thousand are to be reliably measured, then the width W of the regions 32, 33, 32' and 33' must be approximately $10^{-1}$ inches, as previously mentioned herein.

Still another method of generating a pulse modulated signal, as mentioned, is to feed both signals $V_A-V_B$ and $V_C-V_D$ into one Schmitt trigger adjusted to start and stop a uniform height pulse at successive changes in the polarity in the signals $V_A-V_B$ and $V_C-V_D$, that is, the Schmitt tirgger 22' (in FIG. 5B, as above discussed) acts first on a zero from $V_A-V_B$ and next on a zero from $V_C-V_D$, next on a zero from $V_A-V_B$, and so forth. Using such a circuit, the pulse train 41 emitted by this pulse generator is that shown in FIG. 6G. The pulse widths $t_1-t_1'$, $t_2-t_2'$, etc. are themselves linearly related to the twist of the shaft so that a time average of the pulse train 41 is directly related to the shaft torque. This means of pulse generation eliminates one Schmitt trigger and the logic gate 26. The time average output coming from the pulse train 41 is used in a manner similar to the average of the pulse train 40.

Keeping the discussion in the previous paragraph in mind, a similar pulse generation scheme can be used when the gain devices 800, 803, 800', and 803' of FIG.

5C are employed in a circuit slightly modified from that shown in FIG. 5C. Here one Schmitt trigger is used and is appropriately interconnected so that a polarity change in the signal from the first pair of optical channels A initiates a pulse, if no pulse is on, and a change in polarity in the signal from the second pair of channels B terminates the pulse; or the Schmitt trigger can be connected so that the roles of A and B are reversed. The pulse train so produced is automatically pulse-width modulated according to the twist of the shaft and no logic gate is required. These pulses also have all the advantages of pulses generated using the scheme in FIG. 5C, i.e., they are very insensitive to electrical instabilities.

In the illustrative example charted in FIG. 6B–6F, fixed-height pulses 38' from the Schmitt trigger 22 are initiated at $t_1$, $t_3$, $t_5$, etc. and terminated at $t_2$, $t_4$, $t_6$; and fixed-height pulses 39' from the Schmitt trigger 23 are initiated at $t_1'$, $t_3'$, $t_5'$ etc. and terminated at $t_2'$, $t_4'$, $t_6'$ etc. Thus, the fixed-height pulse trains 38 and 39 in FIGS. 6D and 6E delivered to an AND logic gate 26 are initiated when the primary signal pulses 36 and 37 pass a zero point changing from negative to positive polarity and are terminated when the primary signal pulses 36 and 37 pass a zero point changing from positive to negative polarity. The output from an AND logic gate 26 is the product pulse train 40 in FIG. 6F. Since the pulse train 40 occurs for such a small element of time and is representative of a situation in which any twist upon the shaft 4 is constant for the period of time in question, the pulses 40' making up the pulse train 40 are of uniform width. However, as before explained, any changes in twist show up in changes in pulse width of the pulses 40'; these latter remarks apply also to the pulses making up the output pulse trains from the other circuit arrangements as well.

The explanation in this paragraph is concerned with a situation wherein the shaft 4 is twisted some angle $\theta$ from the unstressed condition. In the explanation, pulses 38', 39' and 40' represent the pulses making up the pulse trains 38, 39 and 40, respectively, as before. In this situation the width of fixed height pulses 38' and 39' equals $$W'T/2\pi r = t_2 - t_1,$$

where $T$ is the period of one revolution of the shaft, $r$ is the shaft radius, $W'$ is the separation between the edge labeled 34A and the edge 34' in FIG. 6A, and $W$ is the width of the absorbing and reflecting areas 32, 33, 32' and 33, and Pulse Area (i.e., the areas of the pulses 38' and 39')
$= A\delta T = AW'T/2\pi r$, where $A$ is height of the pulses 38' and 39' (which must be very constant). The voltage delivered by the time averager 27 is $$\overline{V_{out}} = NA\delta T/T = NAW'T/2\pi rT = NAW'/2\pi r,$$

where $N$ is the number of shaded (or reflecting) areas around the shaft. It will be observed that $\overline{V_{out}}$ is independent of shaft angular velocity. Continuing with the analysis $$t_1 - t_1' = (C' = r\theta)/(2\pi r)T,$$

where $C'$ is a constant depending on the zero stress alignment of bands 100 and 101. The area of the fixed-height, variable-width pulses 40' equals $$A(t_2 - t_1') = A(t_2 - t_1 + [C' + r\theta/2\pi r] T).$$

The voltage out at some twist valve $\theta$ is $$\overline{V_{out}} = (NA/2\pi r) [W' + C' + r\theta]$$

Therefore, the averaged or integrated signal is linear as a function of twist of the shaft 4. Each pulse 40' must have a rise time that is much less than the time required for an area 32, 33 etc. to pass the detector light pipes.

As explained earlier, the embodiment shown in FIG. 5C will result in very sharply defined pulses whose widths are determined by the cross dimensions of the optical elements 104, 105, 104' and 105' (i.e., the width of the fibers and associated light-sensitive diodes, see previous explanations about width $X_1 - X_o$ in connection with FIG. 5D).

Previous mention has been made of the possibility of using a control function generator 320 to receive the output of 19' from the multiplier 7 and to process the signal in a way to provide control functions of the type $f_i = \Sigma/n\ A_n^i P^n$, One such control function generator is shown in FIG. 7 wherein the line 19' is connected as an input to a block designated $P$ the output of which is fed to three multipliers 50, 51, and 52. A further input to the multiplier 50 is introduced to provide an output $P^2$ and this output $P^2$ in turn is introduced as an input to a multiplier 54, the other input to which is the constant $A_2^i$ and the output from which is $A_2^i\ P^2$. The output $A_2^i\ P^2$ is connected as one input to an adder 55, the output from which is connected to the servo device 29. As shown in FIG. 7, the other factors in the function $f_i$ are similarly developed and it is to not believed that any further explanation is required other than that shown in the figure. It will be understood that the torque signal and the angular velocity signal can be similarly expanded, as before mentioned, should such expansion be of use in connection with the control functions.

As best shown in FIG. 6A the various shaded and reflectant areas of the pair of bands 100 are displaced at some angle from the corresponding shaded and reflectant areas in the pair of bands 101. Ideally a line drawn through the edges of the areas of the one pair of bands and parallel to the axis of the shaft will pass through the center of a corresponding area of the other band. In this way any twist of the shaft due to torque thereupon in either direction can be measured. This means, however, that in the absence of some correction mechanism, there will be a signal indicating torque when no torgue exists. To correct this, there is provided a potentiometer 56 in FIG. 5A to zero the reading at a no-twist condition irrespective of the alignment of the area of the bands. The potentiometer is connected across a voltage $V_o$ and the slider 57 of the potentiometer is connected as one input to a further differential amplifier 58, the other input to which is received from the logic gate 26 and the output from which is connected through the time averager 27 to the multiplier 7. In this way, when the automobile is manufactured and when the vehicle is serviced, the potentiometer can be adjusted by moving the slider 57 to give a zero reading at zero torque. The potentiometer, which ideally is circular, can have a screw-type adjustment to allow periodic adjustment, if and when needed. The pulse train 40 is averaged by the time averager 27 over one or two revolutions of the shaft 4 to remove small errors due, for example, to small differences between the widths of the areas 32, 33, etc.

In the foregoing discussion, the preferred embodiment shows two pairs of bands which may be photo-etched strip material, having an adhesive on the back thereof, wound around the shaft 4. It is not necessary that the width of the areas 32' and 33' (or the width W of the areas 32 and 33) be identical since the signals are time-averaged, as mentioned, and indeed are time-averaged over one or two revolutions of the shaft, or more. It is desirable, however, that the widths W be somewhat close to one another. By photo-etching, great accuracy of width can be obtained since the strips or ribbons from which the bands 100 and 101 are made can be printed on a roll with an adhesive backing and merely wrapped around the shaft. The strip can be made of a thin metal foil or the like, as is known, which provides a very useful and economical apparatus. As explained above, when the method of pulse generation described in FIG. 5C is used, it is the widths of optical elements 104, 105, 104' and 105' that determine the pulse widths.

While for many production reasons the light absorbing and light reflectant areas are preferred for present purposes, it should be apparent that the binary signals of the channels A–D could be produced by areas which are alternately light transmitting and opaque (e.g., notched flanges and the like). Thus, useful devices can be made employing notched flanges, as later discussed herein, or the absorbant and reflectant areas 32 and 33 respectively, can be photoetched upon a solid flange and mounted somewhat similarly to the flange in the Allison patent. In some instances where the power transmitting shaft is subjected to considerable mechanical motion it may be desirable to bring the bands 100 and 101 as close together as possible in order to avoid spurious signals due to differing motions of structures 8 and 9 relative to one another and to the shaft. In this case a sleeve labeled 110 in FIG. 8 is firmly attached to shaft 4 at 111 and is supported by bearings 112 and 113 so that sleeve transmits no torque. Now the structures 8 and 9 may be located close together.

In the embodiment of FIG. 9A, the optical channels A and B comprise a single strip 14" and pick-up element 104" and 105" (corresponding to elements 1, 104 and 105 in FIG. 6A), the elements 104" and 105" being in a serial position, as distinguished from what may be termed a parallel arrangement in FIG. 6A. The strip 14" is made up of reflectant areas 33" and absorbent areas 32", the width of two combined areas 32" and 33" being designated R and the circumferential length of each of the pick-up elements 104" and 105" being designated M. To perform the required function R>M>R/2. As the strip moves in the direction of the arrow labeled H' a primary signal pulse train 80 is formed. As shown in FIG. 9B, the pulses 80' making up the primary signal pulse train 80 have zero crossing separated by times which are functions of R and the pulses are flattened at their maxima during times which are functions of R/2. A further single strip similar to 14", secured to an axially-spaced region along the shaft, can serve as optical channels C and D.

The optical channels A, B, C and D in the embodiment shown in FIGS. 14 and 15 are provided by chopping radiation from radiation sources 136 and 137 by the use of slotted flanges 139 and 139' secured to the shaft 4 at axially-spaced regions along the shaft. The flanges, being secured as they are to the shaft, rotate when the shaft rotates and present alternately between the respective radiation source and the pick-up diodes again called $D_1$, $D_2$, $D_3$ and $D_4$, areas 133 and 132 which are radiation transmitting and opaque to such radiation. The areas 133 in the illustrative example are slots or apertures and the opaque areas 132 are teeth. The areas 132 and 133, of course, span the whole of each flange to form bands 141 and 142 which differ mechanically from the strips 14–16 but are analogous in terms of the optics of the system. Again the detecting diodes $D_1$ and $D_2$ (as well as $D_3$ and $D_4$ in the case of the associated flange 139' ) each detect or sense the passage of a boundary (or edge) 140 between a radiation transmitting area 133 and a radiation opaque area 132, the primary electric signals in this embodiment being similar to those shown in FIGS. 6B and 6C. The signals produced, upon rotation of the shaft, at the flanges 139 and 139' are combined, as before, to produce electrical pulses of fixed amplitude, but of width determined by the time interval between passage of an edge 140 in the flange 139 and a similar edge in the flange 139'. Thus, again pulse width is varied as a function of twist of the shaft 4 and consequent angular displacement between the flanges 139 and 139'; and the pulses can be averaged in the manner before discussed herein to provide torque indications as a function of a time channel which is shown herein in the form of an optical time channel. The bands 141 and 142 are held together by an outer ribbon 138 and an intermediate ribbon 134, and they are secured to the shaft 4 by an inner ribbon 135.

The explanation in this paragraph is again made with reference, primarily to the FIGS. 14 and 15, except that the band 142 only on the flange 139 (and associated apparatus) is discussed, it being understood that a similar band is found on the flange 139'. The flanges or elements 139 and 139' are thus located at axially spaced regions along the shaft 4 and carry at each region the contiguous areas 132 and 133 of different optical characteristics having the sharply defined boundary or edge 140 therebetween. Radiation from the radiation source 136 passes through the slot areas 133 and is detected by the detector $D_2$ (radiation from the radiation source 137 is detected by the detector $D_4$), as above explained, thereby to detect or sense the passage of each boundary and to generate primary electric signals, like the signals 36 and 37, which bear a fixed relation in time to the passage of the boundary. The output of the detectors $D_2$ and $D_4$ are connected to a flip-flop or Schmitt trigger, like the Schmitt trigger 22 (or the Schmitt trigger 23) which constitutes a part of the electrical circuit means for processing the primary electric signals 36 and 37 from the diodes $D_2$ and $D_4$ in a way that produces electrical pulses, like the pulses 40', of a fixed amplitude but of width determined by the time lapse between the passage of a boundary 140 on the flange 139 at one said region past the diode $D_2$ and passage of a boundary on the flange 139' at the other region of the shaft by the diode $D_4$ (i.e., the width of the pulse 40' is a function of the phasing of the pulses 36 and 37). In this way a pulse train 40 can be generated and it can be further processed in the manner discussed elsewhere herein. The pulse train 40 can also be formed by connecting the output of Schmitt triggers, like the Schmitt triggers 22 and 23 (i.e., output signals like the signals 38 and 39, respectively) to an AND gate like the AND gate 26. It should be noted that the output of either Schmitt trigger can be inverted prior to introduction to the AND gate to generate signals like the variable-width pulse train 41 in FIG. 6G.

Mechanical motion of the torque transmitting shaft 4 can introduce spurious signals which must be compensated for. In the previous discussion, the overlap pulse width between the pulse width modulated train produced by the A–B channels and the C–D channels is $t_2 - t'_1$ in FIG. 6F (also called $\delta T$ herein) and is subjected to fluctuations $\delta t$. If the pulse height of the pulse width modulated train is H and subject to variations $\delta H$, and if the pulse width produced by a given torque is $\delta T - (t_2 - t''_1)$, then the signal produced is proportional to $H\delta W$ and the noise is proportional to $H\delta t + \delta T S H$. If, in the automobile example cited above, the torque-induced displacement of the bands 100 and 101 in FIG. 6a is $10^{-4}$ inches, corresponding approximately to 10 ft.-pounds of torque, the minimum measured quantity, then for a signal to noise ratio of unity at 10 ft.-pounds, it is required that $\delta H/H \leq 10^{-3}$ and $\delta t/t \leq 10^{-3}$. A shaft subject to time average motion with respect to the fixed detector housings 8 and 9 in FIG. 2 could introduce serious noise into the torque-meter. This can be largely eliminated by use of a third pair of channels E–F, that comprise a pair of bands 101', light sensitive devices $D_5$ and $D_8$, and light pipes 104'' and 105'', respectively, in FIG. 16. The pair of bands 101', as before, comprises member bands 16'' and 17' similar to the members 16 and 17 before mentioned; and, in FIG. 16, other elements which perform similar functions to the functions performed by elements in previous figures are labeled as before. The members 16' and 17' as well as the members 16 and 17 are mounted on the sleeve leveled 110 attached to the shaft 4 at 111, just as is the sleeve in FIG. 8. Thus, the embodiment shown in FIG. 16 has three pairs of optical channels, A–B, C–D, and E–F, the band members 14 and 15 of the channel pair A–B being wound about the shaft 4 at a first region thereof, as shown, and the band members 16 and 17 and 16' and 17' of the channel pairs C–D and E–F, respectively, being wound about the sleeve 110. The sleeve 110 is secured, again at 111, to the shaft 4 at a second region axially displaced from the first region and the sleeve extends axially toward the first region, as shown, in order to bring the band pairs 100, 101 and 101' into close proximity, one to the other. The axial separation of the first pair of band channels 100 and the second pair of band 101 is labeled S and this is also equal to the axial separation between the second pair 101 and third pair 101'. Since the sleeve 110 transmits no torque, any change in the time average of the combined pulse train at 231 derived from the C–D channels and at 232 from the E–F channels in FIG. 17 is due to mechanical and, in some cases, electronic noise. As shown in FIG. 17 this signal is called $\bar{M}$. The signal 230 from the pair of bands 100 and 231 from the pair of bands 101 are processed as described above and indicated in FIG. 17 and the time average of the processed signal contains a torque part $\bar{T}$ and a noise part $\bar{M}$. Subtracting these signals at 217 of FIG. 17 produces a time average signal at the output designated 18 corrected for mechanical and electronic noise. The signal at 18 is produced and processed by circuitry like the circuitry previously discussed herein. The blocks numbered 26' and 27' function similarly to the blocks 26 and 27 in FIG. 5A and the further blocks in the flow-type chart of FIG. 17 need no explanation other than that contained in the chart itself.

The servo devices are shown in block diagram form in the drawing. Servo devices that are useful for control purposes are described in many publications including: "Theory of Servo-Mechanisms," H. L. Hazen, Journal of the Franklin Institute, September, 1934, pg. 279; "Servo Mechanism Fundamentals," Lauer et al., McGraw Hill, 1947; "Inertial Navigation Systems," Broxmeyer, McGraw Hill, 1964; "Nonlinear Automatic Control," Gibson, McGraw Hill 1963; "Principles of Control Systems Engineering," Del Toro and Parker, McGraw Hill (1960).

The output of the threshold devices (i.e., the Schmitt triggers) is controlled in the embodiment discussed herein by changes in polarity of the input signal thereto. That output can, however, be controlled at some other predetermined voltage level by appropriate biasing.

The terms "optical," "light," and "radiation" as used herein are intended in the various contexts to denote a spectrum of radiation which may include the visible spectrum and in the preferred embodiment does in fact relate to the visible spectrum, but the terms are intended to cover as well frequency ranges of radiation outside the visible spectrum. Indeed, the radiation source should be matched to the response function of the detector ($D_1$, $D_2$, etc.); thus, for example, the light source can be a GaAs light emitting diode which radiates at about 1.38 ev and the detector would be a silicon photo-detector, or the light source can be an incandescent filament and the detector a silicon or germanium or GaAs semiconductor detector.

Modifications of the invention herein described will occur to persons skilled in the art and all such modifications are deemed to be within the spirit and scope of the invention as defined in the claims.

What is claimed is:

1. A torque-meter comprising, in combination, a shaft whose output torque is directly related to the output power of a prime mover, a first pair of contiguous annular bands disposed around the shaft at a first region, a second pair of annular bands disposed around the shaft at a second region axially spaced along the shaft from the first region, each member of said pair of bands being composed of alternate areas having different light reflecting and light absorbing characteristics, the areas of one member of a pair of one characteristic being immediately adjacent the areas of the other member of the pair having another characteristic, a radiation source associated with each pair of bands and operable to direct radiation upon each member thereof, radiation pick-up means associated with each member positioned to receive reflected radiation from that member, the outputs of each pick-up means to provide at any instant of time a net output signal that indicates a difference in the reflected radiation from the individual member bands of each of the associated pair of bands, a differential amplifier connected to receive the net output signal from each pick-up means, a pulse generator connected to receive an output from each of the differential amplifiers and to provide a train of fixed-height output pulses, changes in the polarity of the net difference signal from each of said pick-up means being effective alternately to initiate and terminate pulses of said train of pulses, and multiplier means connected to receive the train of pulses from each pulse generator and to give an output product pulse train, the width of each pulse member of the product train being related to the twist angle or torque of the shaft between the axially separated first and second pairs of bands.

2. Apparatus for measuring torques transmitted by a rotating shaft that comprises, in combination, optical means that includes first means secured to the shaft at one region thereof and second means secured to the shaft at another region thereof axially displaced along the shaft from the first region, the first means and the second means being angularly movable relative to one another as a consequence of twist of the shaft resulting from the transmitted torque, radiation source means and pick-up means operable, in combination with the first means and the second means, to provide two difference, primary signals, electrical circuit means connected to receive and to combine the two difference, primary signals to give a train of electric pulses whose pulse width is determined by the combined difference signals, the width of the pulses of the train of electric pulses being variable as a function of the torque transmitted by the shaft and resulting twist thereof, and interpretable to give an indication of said torque transmitted by the shaft, the first means, the second means and the radiation source and pick-up means being mechanically disposed relative to one another so as to measure torque in either direction, said first means and said second means each being contiguous pairs of bands, each band of the pair having adjacent areas operable to effect changes upon radiation directed upon the bands as the shaft rotates.

3. Apparatus as claimed in claim 2 in which said areas are alternately radiation transmitting and opaque to the radiation, thereby respectively to transmit and block said radiation, radiation source means being positioned to direct radiation upon said areas.

4. Apparatus as claimed in claim 3 in which the first means and the second means are each a slotted flange, the radiation transmitting and opaque areas being respectively slots and teeth of each said flange, and in which the slots and teeth of each flange are displaced angularly with respect to one another in such a way as to permit measurement of torque in either direction.

5. Apparatus for measuring torques transmitted by a rotating shaft that comprises, in combination, optical means that includes first means secured to the shaft at one region thereof and second means secured to the shaft at another region thereof axially displaced along the shaft from the first region, the first means and the second means being angularly movable relative to one another as a consequence of twist of the shaft resulting from the transmitted torque, radiation source means and pick-up means operable, in combination with the first means and the second means, to provide two difference, primary signals, electrical circuit means connected to receive and to combine the two difference, primary signals to give a train of electric pulses whose pulse width is determined by the combined difference signals, the width of the pulses of the train of electric pulses being variable as a function of the torque transmitted by the shaft and resulting twist thereof, and interpretable to give an indication of said torque transmitted by the shaft, the first means, the second means and the radiation source and pick-up means being mechanically disposed relative to one another so as to measure torque in either direction, the optical means comprising two pairs of optical channels, the first pair of optical channels having two channels A and B each of which establishes binary optical signals, means for converting the binary optical signals to voltage signals $V_A$ and $V_B$, respectively, means for establishing further signals $S_1 = V_A - g_B V_B$ and $S_2 = g_A V_A - V_B$, a differential amplifier A-1 connected to receive $S_1$ and another differential amplifier A-2 connected to receive $S_2$, the second pair of optical channels having two channels C and D associated with a region of the shaft axially separated from the location of the first pair and adapted to establish binary optical signals, means for converting the binary optical signals to binary voltage signals $V_C$ and $V_D$, respectively, means for establishing further signals $S_1' = V_C - g_D V_D$ and $S_2' = g_C V_C - V_D$, a differential amplifier A-1' connected to receive $S_1'$ and another differential amplifier A-2' connected to receive $S_2'$ [A-2] the outputs of each of the amplifiers A-1 and A-2 being connected to a Schmitt trigger adjusted to initiate or terminate a pulse whenever either A-1 or A-2 goes through a predetermined voltage level, the pulses being sequentially started by a signal $[S_1]$ from A-1 and stopped by a signal $[S_1']$ from A-2, or vice versa, and started by a signal $[S_2]$ from A-1' and stopped by a signal $[S_2']$ from A-2', or vice versa, the pulse width being a measure of the torque being transmitted by the shaft and being varied as a function of said torque.

6. Apparatus as claimed in claim 5 having a time averager connected to receive the variable-width pulse train and to provide a time averaged electric output.

7. Apparatus as claimed in claim 5 that includes a function generator and in which the means for deriving the angular velocity is connected to the generator, the function generator being operable to provide a complex polynomial of angular velocity.

8. Apparatus as claimed in claim 5 having a function generator connected to receive an electric signal derived from the train of electric pulses of variable width and operable to develop a complex polynomial of torque.

9. Apparatus for measuring torque transmitted by a rotating shaft, that comprises: a pair of axially spaced regions along the shaft at which are located elements carrying two contiguous areas of different optical characteristics having a sharply defined boundary therebetween, optical means at each region for detecting the passage of at least one said boundary at each region and generating primary electric signals which bear a fixed relation in time to the passage of the boundary, electrical circuit means for processing the primary electric signals from the optical means in a way that produces electrical pulses of fixed amplitude but of width determined by the time interval between the passage of a boundary at one region past the optical means at that region and passage of a boundary at the other region past the optical means at said other region, said optical means comprising a solid-state radiation detector whose effective light sensitive zone is small in cross dimension in the direction of travel of said areas therepast and whose light-to-electrical-energy time constants are fast compared to the time of passage of the areas past the detector.

10. Apparatus as claimed in claim 9 that includes means providing patterns of adjacent light and dark areas at said regions.

11. Apparatus as claimed in claim 9 that includes means providing a plurality of adjacent areas that are respectively radiation transmitting and opaque to radiation.

12. Apparatus as claimed in claim 9 in which each element is composed of a plurality of alternate areas having different optical characteristics and a sharply defined boundary between adjacent areas.

13. Apparatus as claimed in claim 12 in which each element is a slotted flange, said areas being alternately slots and teeth of each flange.

14. Apparatus as claimed in claim 12 in which said areas are alternately radiation transmitting and radiation opaque.

15. Apparatus as claimed in claim 12 in which the optical means at each region comprises a source of electromagnetic radiation and detector means positioned to receive radiation from the source, the radiation from the source being directed upon the element at each region and being modified by the element, and the thusly modified radiation being picked up by the detector means.

16. Apparatus as claimed in claim 12 in which the electrical circuit means includes a threshold device associated with each said element and connected to receive the primary electric signal generated at the region of the associated element to provide a binary output signal, the switching times of the primary electric signal bearing a fixed relation in time to the passage of an boundary past a predetermined point in the optical means.

17. Apparatus as claimed in claim 16 which includes a logic gate connected to receive the output of the threshold device associated with each element as inputs thereto, the output of the logic gate being said electrical pulses of fixed amplitude but of width determined by the time interval.

18. Apparatus as claimed in claim 17 having a time averager connected to receive the output of the logic gate.

19. Apparatus as claimed in claim 17 in which the time averager includes zero-adjust means.

20. Apparatus for measuring torque transmitted by a rotating shaft that comprises, in combination, three pairs of optical channel means, one pair being connected to the shaft at a first region thereof and the other two pairs being connected to the shaft at a second region thereof axially displaced from the first region, said other two pairs being associated with a sleeve which is secured to the shaft at the second region and extends axially toward the first region, means for deriving a difference signal separately from each pair of optical channel means, means for combining the difference signal from the pair of optical channels associated with the first region with at least one of the difference signals from the two pairs of optical channels associated with the sleeve to give a train of electric pulses whose pulse width is determined by the combined difference signals, means for combining the difference signals from the two pairs of optical channel means associated with the sleeve to give a further train of electric pulses whose pulse width is determined by the combined difference signals from the channels associated with the sleeve, means for combining the train of electric pulse with the further train of electric pulses to provide an output signal which varies as a function of the torque transmitted by the shaft.

21. A torque-meter comprising, in combination, a pair of elements, each carrying a plurality of contiguous areas of different optical characteristics having a boundary therebetween, the elements being oriented coaxially to one another and being located in two axially-spaced regions, said elements being bound together by a mechanically coupling member and rotatable therewith, the elements being relatively angularly displaceable about the axis with respect to one another in either direction through a variable angle $\theta$, but within the constraints of said mechanically coupling member whose elastic modulus relates to the amount of torque required to effect relative angular movement between the elements in either direction, and optical means, there being relative rotation between said mechanically coupling member and the elements attached thereto and the optical means in the functioning torque-meter, said optical means including radiation source and pick-up means for detecting the passage of a boundary on each element and operable to provide an electric signal as a series of electric pulses of variable width and whose width bears a relationship in time between the passage of a boundary on one element and the passage of a boundary on the other element to indicate the magnitude of the angle $\theta$ in either direction of twist between the two axially separated elements, said pick-up means being a light-sensitive detector means whose effective light sensitive region is very small in cross dimension in the direction of travel of said areas therepast and whose time response constants are sufficiently fast that the rise and fall times of each electric pulse are much less than the time duration of the pulse.

22. A torque-meter as claimed in claim 21 in which the detector is a solid-state detector and in which the mechanically coupling member is a shaft that is free to rotate relative to the optical means.

23. A torque-meter as claimed in claim 22 in which each said element is a flange having slots and teeth, attached to the shaft at axially spaced regions along the shaft, the slots and teeth of one element being deliberately aligned relative to the slots and the teeth on the other element to allow torque to be measured in either direction.

24. A torque-meter as claimed in claim 23 in which the shaft is a steel shaft having an elastic modulus of $\sim 1.7 \times 10^9$ pounds/ft$^2$.

25. A torque-meter as claimed in claim 22 in which the cross dimension of the effective light sensitive region of the solid-state detector is no greater than 0.01 inches.

26. A torque-meter as claimed in claim 22 in which the cross dimension of the effective light sensitive region of the solid-state detector is small enough to allow determination of the angle $\theta$ to within 2% of the maximum torque sensed by the torque-meter.

27. A torque-meter as claimed in claim 22 in which the cross-dimension of the effective light sensitive region of the solid-state detector is small enough to allow sensing of relative angular movement between the boundary on one element and a boundary of the other element at least as small as $10^{-4}$ inches.

28. A torque-meter as claimed in claim 22 in which the optical means includes two radiation sources and two pick-up means, one of each associated with each element, each pick-up means being operable to receive as input a binary-type light message and to provide as output a primary electric signal as a series of pulses and which further includes means connected to receive the primary electric signal from the two pick-up means as input and to provide as output said electric signal as a series of pulses of variable width.

29. A torque-meter as claimed in claim 28 in which the last-named means is a threshold device.

30. A torque-meter as claimed in claim 28 that further includes means for determining changes in the width of the pulses and hence the magnitude of $\theta$, consideration being taken of the elastic modulus of the mechanically coupling member, to provide an indication of torque being transmitted by the member to effect said twist.

31. Apparatus as claimed in claim 22 in which the angle $\theta$ is determined to within one part in one thousand.

32. Apparatus as claimed in claim 31 in which the signal-to-noise ratio is a minimum of unity.

33. A torque-meter as claimed in claim 22 that includes noise filter means operable to remove mechanical noise, including spurious signals introduced by mechanical motion of the torque-transmitting shaft and between the shaft and the pick-up means, and electrical noise.

34. Apparatus as claimed in claim 33 in which the pair of elements comprises a first element secured around the shaft at a first axial region of the shaft and a second element disposed around the shaft and secured thereto at a second region axially displaced from the first region, the second element being mounted on a coaxial sleeve secured to the shaft at said second region, the sleeve extending from the second region axially toward the first region so that the contiguous areas of the second element are in close proximity to the contiguous areas of the first element.

35. Apparatus as claimed in claim 34 in which the noise filter means comprises a third element, like the second element, mounted on the sleeve adjacent the second element, radiation source and pick-up means associated with the third element to provide a further electric signal as a series of electric pulses that are processed with the first-named series of electric pulses to correct for mechanical and electronic noise.

36. Apparatus as claimed in claim 21 that further includes time averager means connected to receive the series of electric pulses of variable width and to time average the same.

37. Apparatus for measuring torque transmitted by a rotating shaft, that comprises, radiation source means, pick-up means, a first element disposed around the shaft and secured to the shaft at a first region of the shaft, a second element disposed around the shaft and secured to the shaft at a second region axially displaced along the shaft from the first region, torque-related twist upon the shaft acting to effect relative angular movement between the first element and the second element, each element being composed of many successive contiguous areas of different optical characteristics having a boundary therebetween, radiation from the radiation source means being chopped by the first element and the second element to provide light signals, the pick-up means being positioned to receive the light signals and thereby sense the passage of a boundary on the first element and the passage of a boundary on the second element past the pick-up means as the shaft rotates and to develop primary electric pulses, the pick-up means comprising radiation detector means whose effective light sensitive zone is small in cross dimension in the direction of travel of said areas therepast and whose light-to-electrical-energy time response constants are fast compared to the time of passage of the areas past the detector means so as to provide primary electric pulses having fast rise times and fall times.

38. Apparatus as claimed in claim 37 in which the radiation source means comprises a radiation source associated with each element, in which the pick-up means comprises a radiation detector associated with each element, each detector being adapted to provide a train of primary electric pulses, and that includes threshold device means connected to receive the train of primary electric pulses from each detector and to develop a train of variable-width pulses, each pulse width being torque modulated and the time average of said train of variable-width pulses being proportional to said torque and dependent on the twist of the shaft as a consequence of said torque.

39. Apparatus as claimed in claim 38 in which the radiation source means is operable to provide radiation in a beam whose cross dimension is comparable to the cross dimension of said zone.

40. Apparatus as claimed in claim 38 in which the second element is mounted on or part of a coaxial sleeve secured to the shaft at the second region, the sleeve extending from the second region toward the first region so that the contiguous areas of the second element are in close proximity to the contiguous areas of the first element.

41. Apparatus as claimed in claim 40 that includes noise filter means that comprises a third element, like the second element, mounted on the sleeve adjacent the second element, radiation source and pick-up means associated with the third element to provide a further electric signal as a train of electric pulses that are processed with the first-named train of electric pulses to correct for mechanical and electronic noise.

42. Apparatus as claimed in claim 41 that includes means connected to receive said train of variable-width pulses and operable to time average the same and that further includes means adapted to adjust the apparatus to provide a zero reading at zero transmitted torque.

43. Apparatus as claimed in claim 42 that includes: means for deriving the angular velocity of the shaft as a train of further electric pulses and means to combine the time averaged, variable-width pulses with the train of further pulses to provide an indication of power being delivered by the shaft, the output signals of the apparatus being all or any one of torque, power, and angular velocity.

44. Apparatus as claimed in claim 43 that further includes a function generator connected to receive at least one of rpm, time rate of changes in rpm, torque and time rate of change of torque and to develop complex functions including power functions.

45. Apparatus as claimed in claim 38 that further includes means operable to remove mechanical noise signals, including spurious signals introduced by mechanical relative motion or displacement between the torque transmitting shaft and the radiation detector means, and electronic noise.

* * * * *